Figure 1:
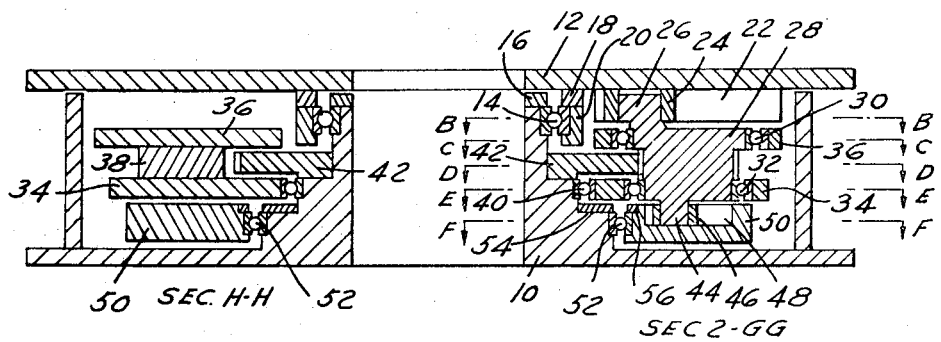

United States Patent

Brems

[11] 3,730,014
[45] May 1, 1973

[54] ROTARY INDEXING MECHANISM
[76] Inventor: John Henry Brems, 32867 White Oaks Trail, Birmingham, Mich.
[22] Filed: Dec. 17, 1971
[21] Appl. No.: 209,319

[52] U.S. Cl. ................................................. 74/394
[51] Int. Cl. ........................................... F16h 57/10
[58] Field of Search ....................................... 74/394

[56] References Cited

UNITED STATES PATENTS

| | | | |
|---|---|---|---|
| 3,407,678 | 10/1968 | Steinke | 74/394 |
| 3,618,722 | 11/1971 | Eschenbach | 74/394 X |

*Primary Examiner*—Leonard H. Gerin
*Attorney*—Arthur Raisch et al.

[57] ABSTRACT

A multiple step rotary indexing machine which is used for indexing a rotary table around an axis. A stationary reaction member such as an internal gear or a sun gear is surrounded by a plurality of planetary gears having an input shaft on one side and an output shaft on the other side. Radial slide members or links connect the input shafts to a rotary power input and similar members connect the output shafts to the rotary table such that a constant input speed can produce a suitably accelerated and decelerated output with a selected dwell period at a selected angle on the rotation.

11 Claims, 24 Drawing Figures

Patented May 1, 1973

3,730,014

10 Sheets-Sheet 1

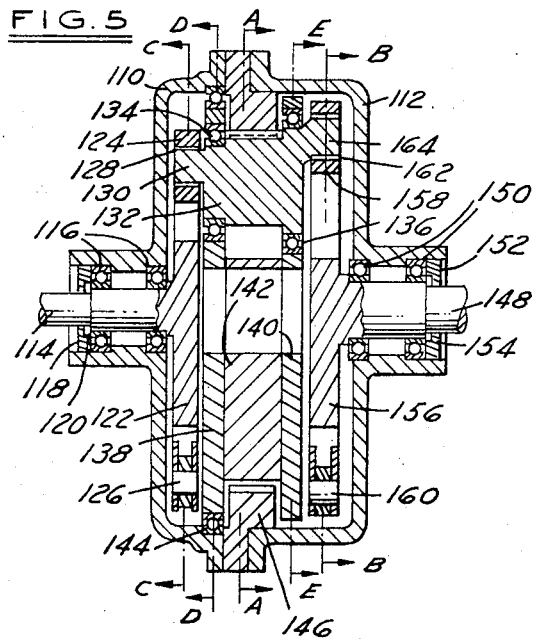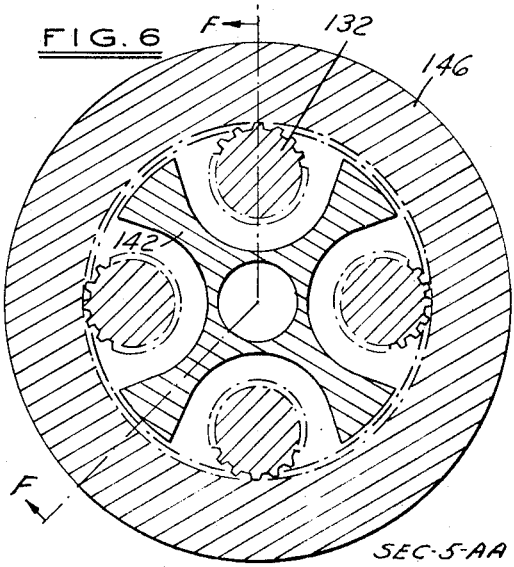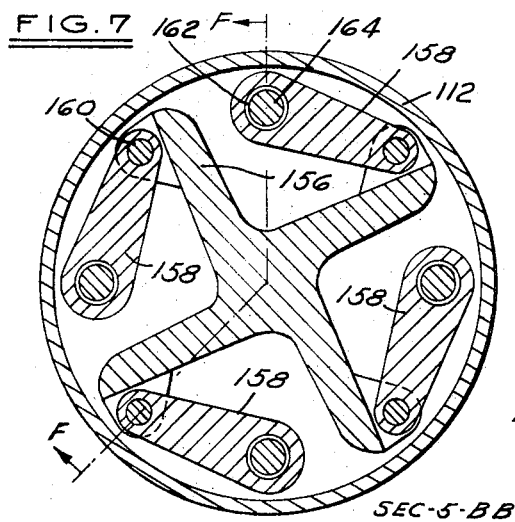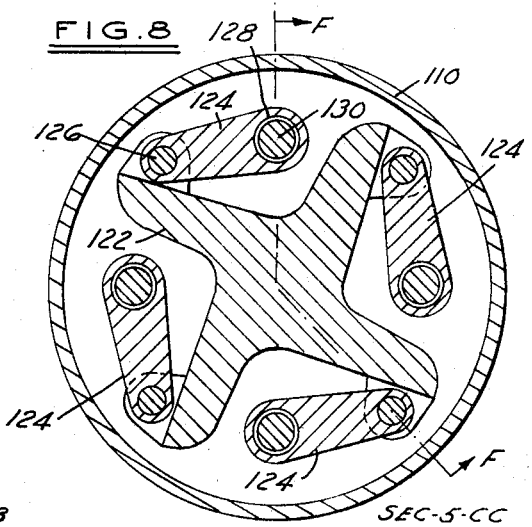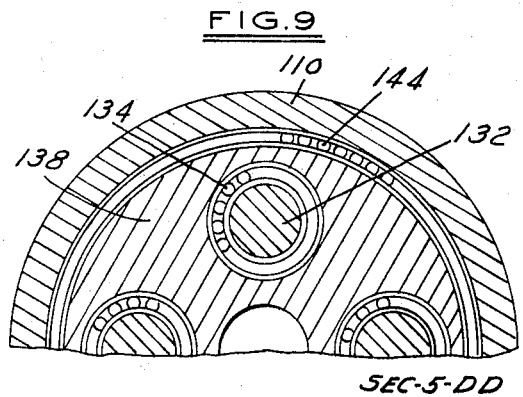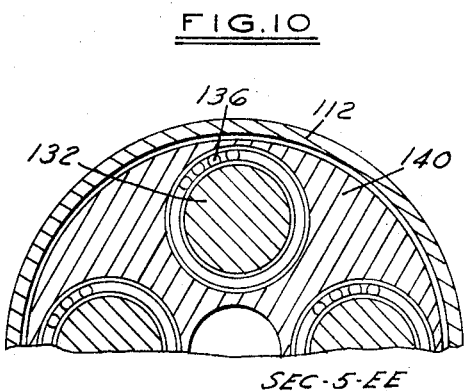

10 Sheets-Sheet 5

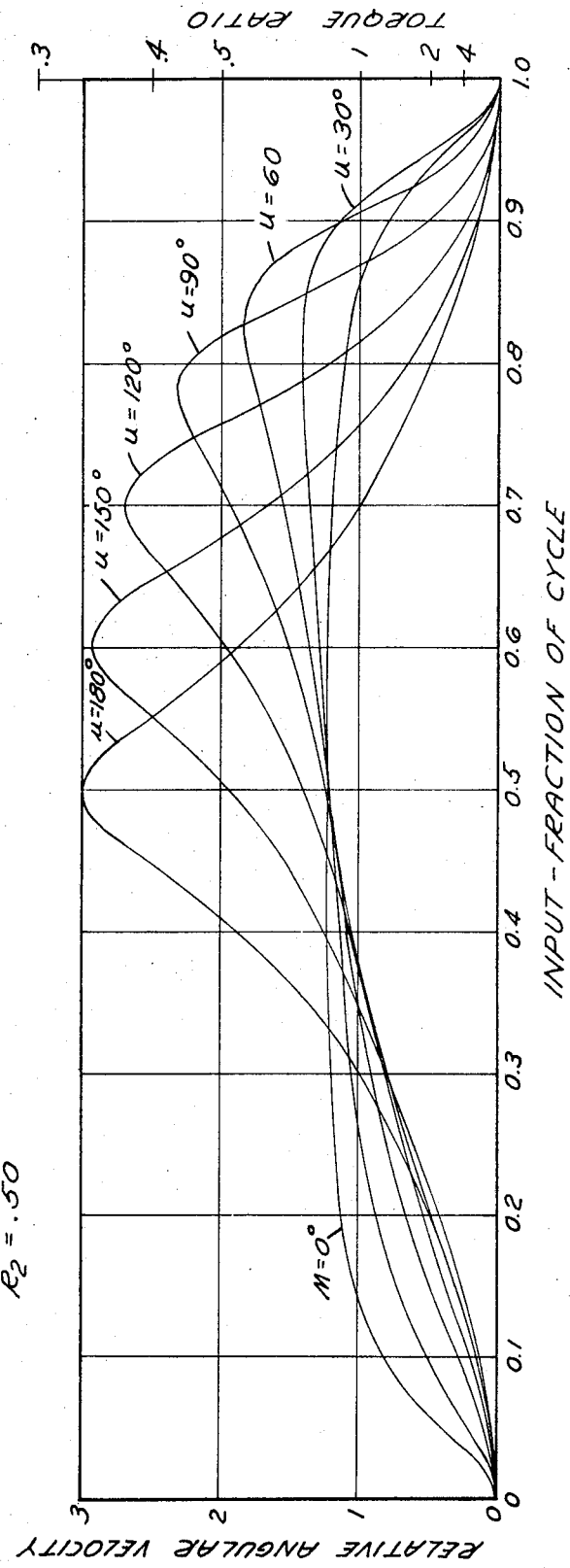

ROTARY INDEXING MECHANISM

This invention relates to a Rotary Indexing Mechanism which generates an intermittent output motion having highly variable output characteristics.

In manufacturing procedures, rotary index mechanisms in a wide variety of styles and output characteristics are employed to move parts from one work station to another where different operations are performed. In general, the output table supports a number of equally spaced work support fixtures which carry workpieces to the various operative machines. Problems have developed in connection with these machines as to acceleration and deceleration, unnecessary time delays, inaccurate stopping points, lack of necessary torque at certain stages in the motion, lack of flexibility in design, inadequate locking means at the individual stations, and absence of smooth acceleration and deceleration characteristics.

It is an object of this invention to provide a mechanism which, for conditions of constant input velocity, generates an output motion having intermittent stops with smooth acceleration and deceleration between stops.

It is a further object of this invention to provide a rotary indexing mechanism in which the dwell at the output stopping points may be varied by controlling certain parameters.

It is a further object of this invention to provide a rotary indexing mechanism in which the output displacement, velocity, and acceleration characteristics may be varied over a wide range by the choice of certain parameters.

It is a further object of this invention to provide a rotary indexing mechanism which, by virtue of multiple drive points, can achieve very high output torques for a given size.

It is a further object of this invention to provide a rotary indexing mechanism in which the output is inherently locked during its dwell position by the inherent characteristics of the mechanism.

It is a further object of this invention to provide an auxiliary precision locking mechanism which is actuated by the basic rotary index mechanism, thereby increasing both the accuracy of the stopping point and the locked torque capacity.

It is a further object of this invention to provide a rotary output mechanism in which the output member rotates through one or more revolutions while going through its acceleration and deceleration cycle.

It is the purpose of the present invention to index an output table through a fractional revolution from one stopped position to another, smoothly accelerating to a maximum speed and then smoothly accelerating to a stop. The novel mechanism described herein is capable of achieving this result generating a very high torque with a relatively small mechanism due to the use of multiple drive points. Furthermore, the characteristics of displacement, velocity, and acceleration for an index cycle can be varied over an extremely wide range through suitable choice of certain internal geometric parameters. This includes such variations as non-symmetry about the midpoint of index of the output characteristics which is valuable in many applications.

The mechanism is equally useful for producing output index angles of one full revolution, or even multiple revolutions, while still maintaining the desired smooth acceleration and deceleration and variability characteristics. This makes it applicable to such functions as stock feeding, peripheral indexing and linear indexing through a rack and pinion output system.

Other applications arise in which a complete stop or dwell of the output is not required but where it is still desired to have a periodic variation in the output velocity. Again, through choice of certain geometric parameters, the mechanism disclosed herein is capable of meeting such requirements with a high degree of flexibility.

The mechanism may be built in two basic modes, a slide mode or a link mode; and in two basic styles, external planetaries or internal planetaries, with cross variations and sub-variations on each.

Other objects and features of the invention relating to details of construction together with the principles thereof and the manner of use and operation will be apparent in the following description and claims in which there is set forth the best mode presently contemplated for practice of the invention.

Figure 2:
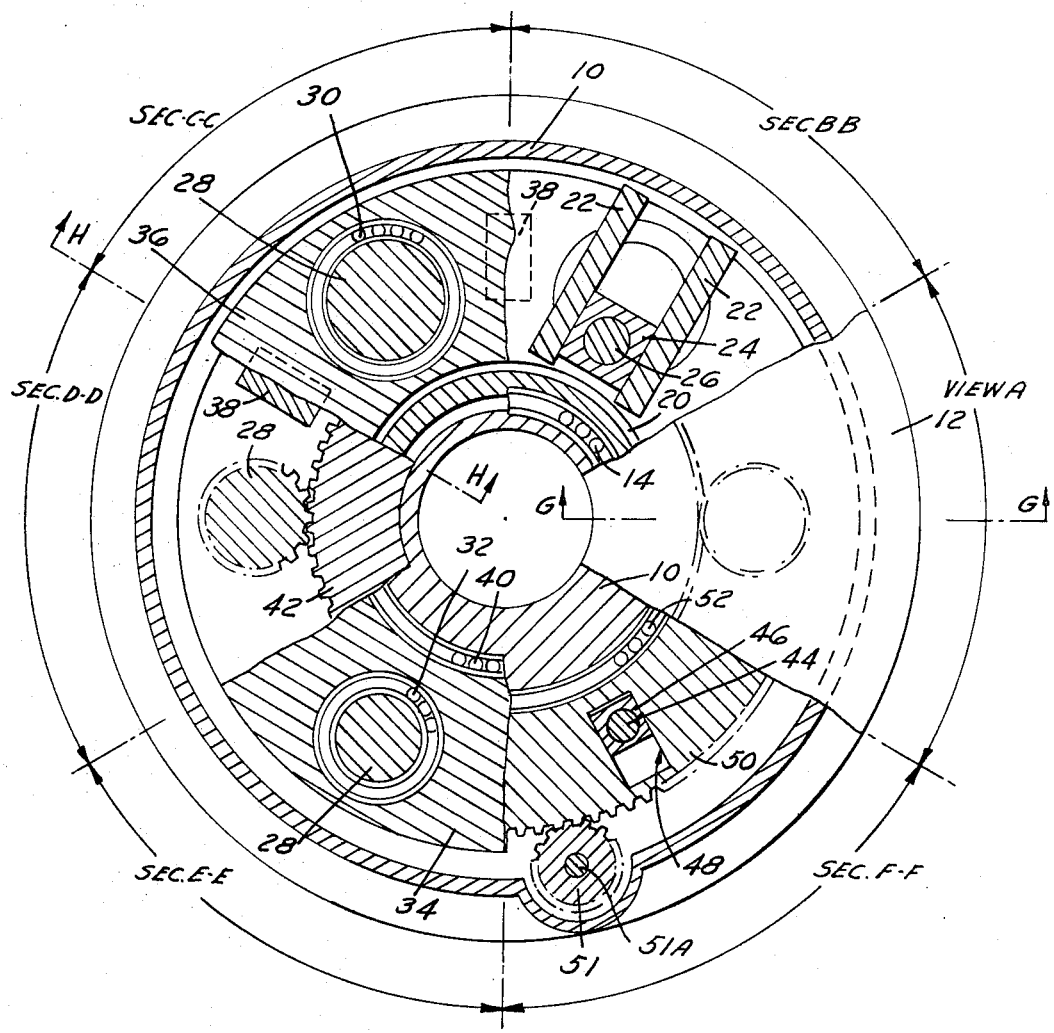

Drawings accompany the disclosure and the various views thereof may be briefly described as follows:

FIG. 1, a split midplane longitudinal section through one embodiment of the mechanism, taken respectively on lines G—G and H—H of FIG. 2 utilizing an external planetary system with a slide mode.

FIG. 2, a series of stepped sections through the mechanism of FIG. 1, taken respectively on lines B—B, C—C, D—D, E—E and F—F of FIG. 1.

Figure 3:
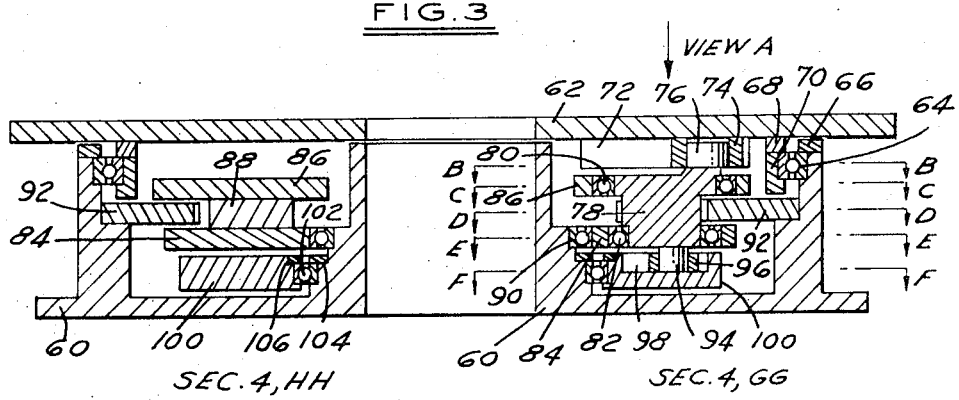
Figure 4:
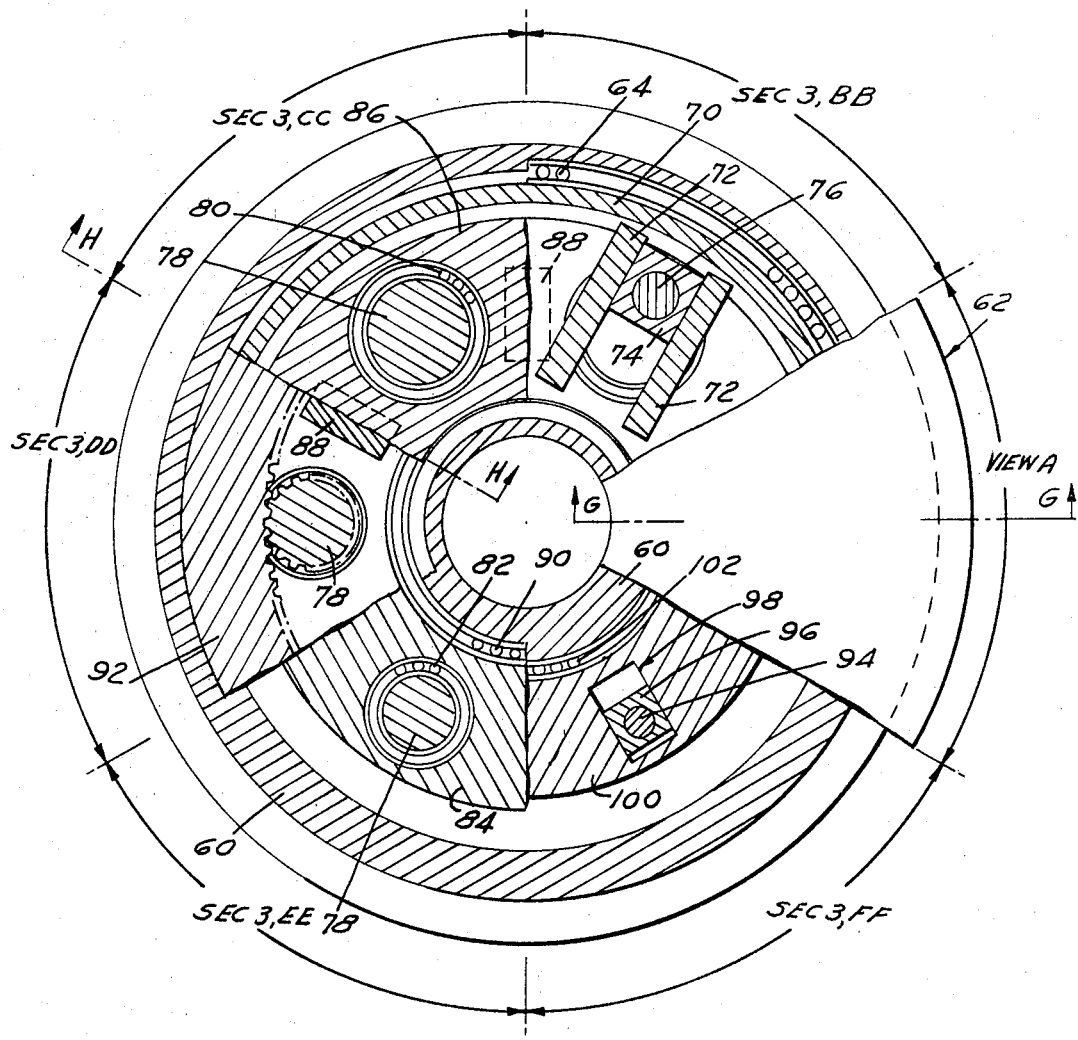

FIG. 3, a split midplane longitudinal section through a second embodiment of the mechanism, taken respectively on lines G—G and H—H of FIG. 4 utilizing an internal planetary system with a slide mode.

FIG. 4, a series of stepped section through the mechanism of FIG. 3, taken respectively on lines B—B, C—C, D—D, E—E and F—F of FIG. 3.

FIG. 5, a split midplane longitudinal section through a third embodiment of the mechanism, taken on line F—F of FIG. 6 utilizing a link mode with the internal planetaries.

FIGS. 6 to 10, a series of transverse sections through the mechanism of FIG. 5, taken respectively on lines A—A, B—B, C—C, D—D, and E—E of FIG. 5.

Figure 11:
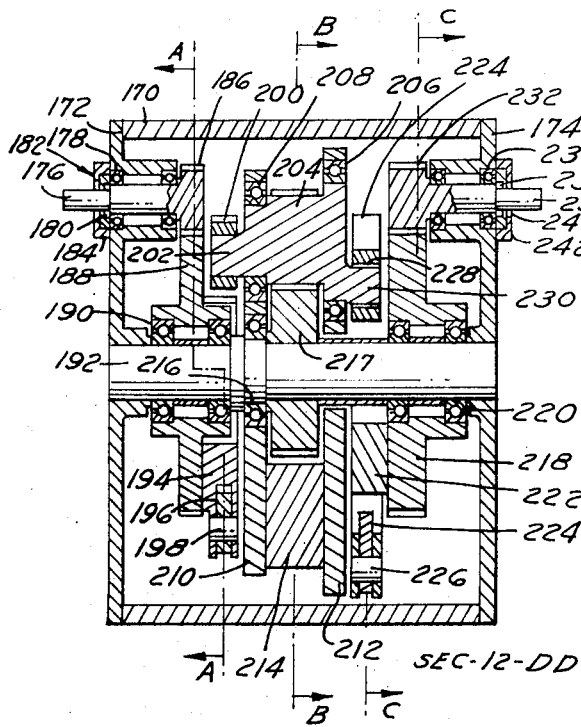
Figure 12:
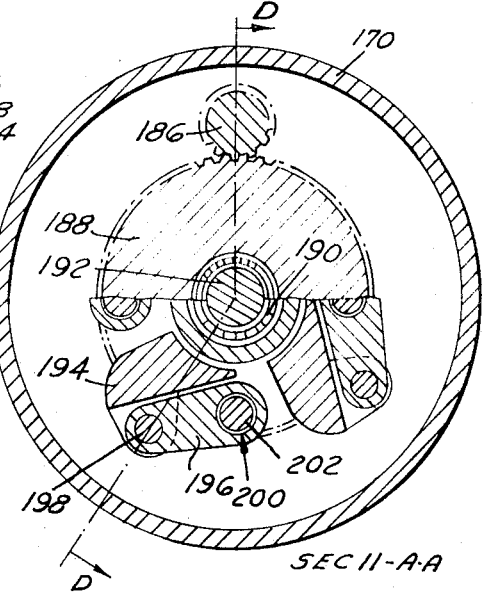

FIG. 11, a split midplane longitudinal section through a fourth embodiment of the mechanism, taken on line D—D of FIG. 12 showing a link mode with external planetaries.

Figure 13:
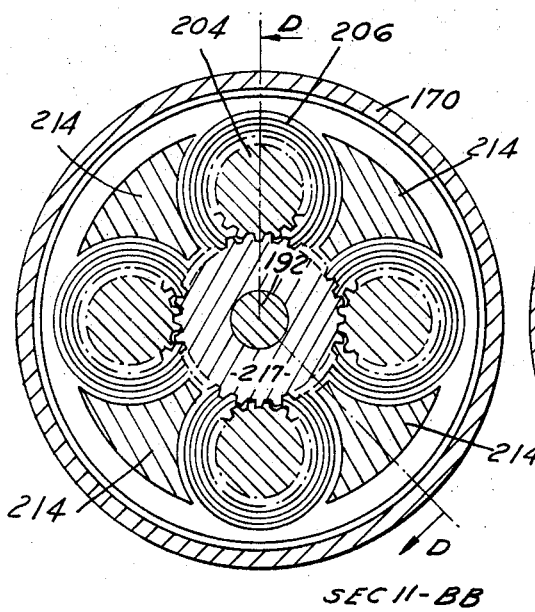
Figure 14:
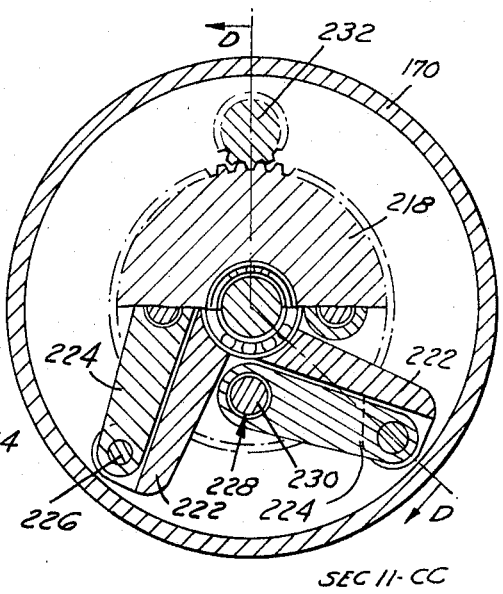

FIGS. 12 to 14, a series of transverse sections through the mechanism of FIG. 11, taken respectively on lines A—A, B—B and C—C of FIG. 11.

Figure 15:
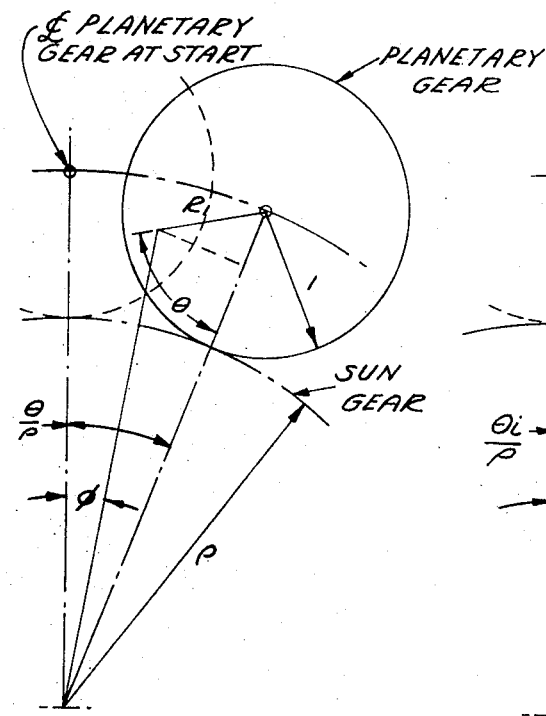
Figure 16:
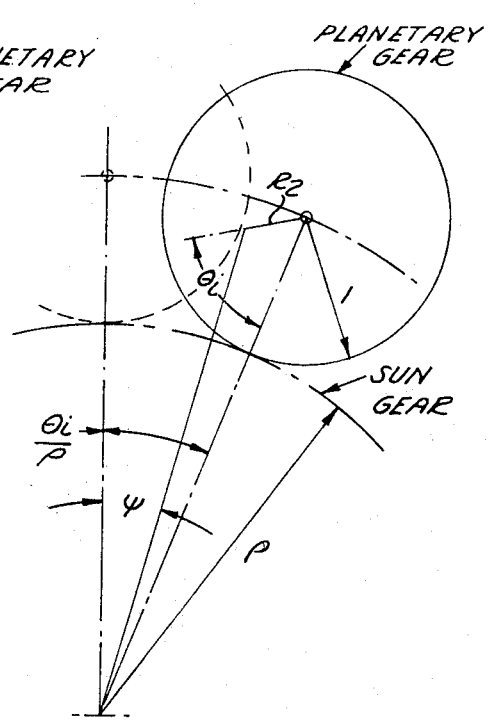

FIGS. 15, 16, kinematic line drawings for a slide mode, external gear system.

Figure 17:
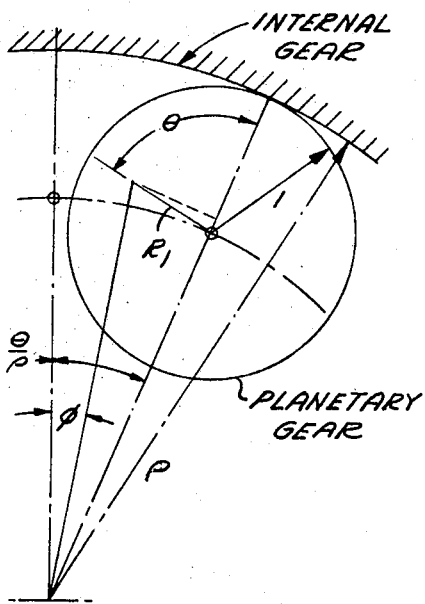
Figure 18:
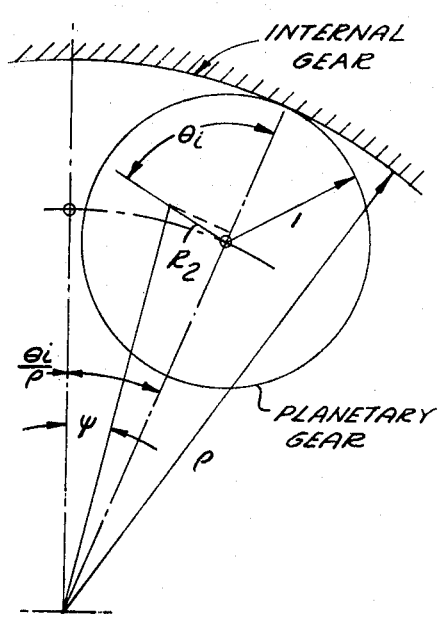

FIGS. 17, 18, kinematic line drawings for a slide mode, internal gear system.

Figure 19:
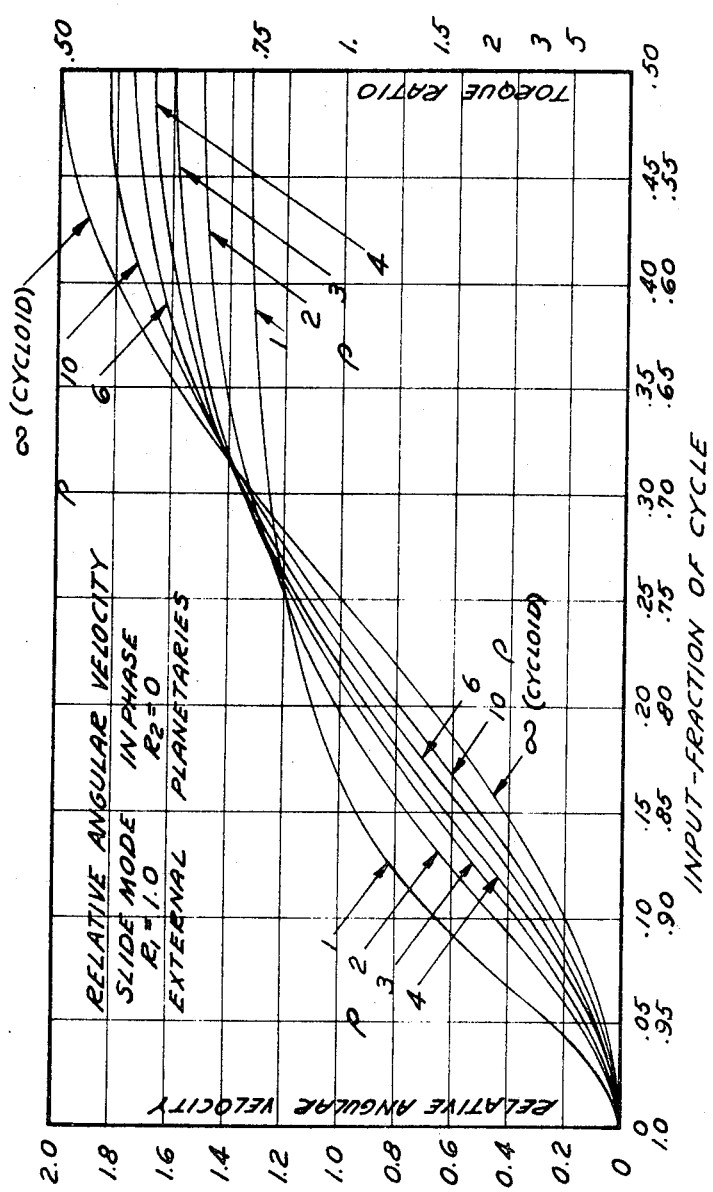

FIG. 19, a series of curves showing relative angular velocities of a slide mode mechanism with external planetaries.

Figure 20:
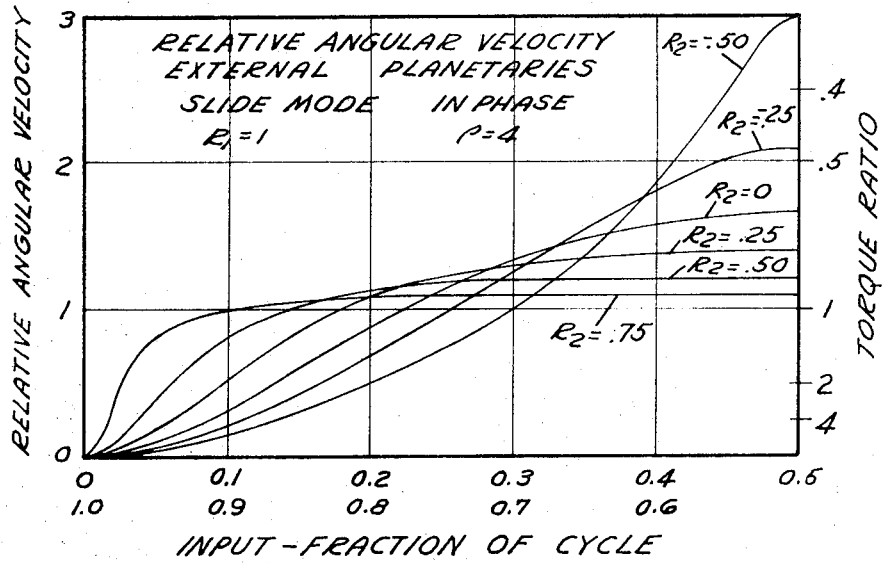

FIG. 20, a series of curves showing relative angular velocities of a slide mode mechanism with a sun gear radius of 4.

FIG. 21, a series of curves showing relative angular velocities for external planetaries in an out-of-phase slide mode mechanism.

Figure 22:
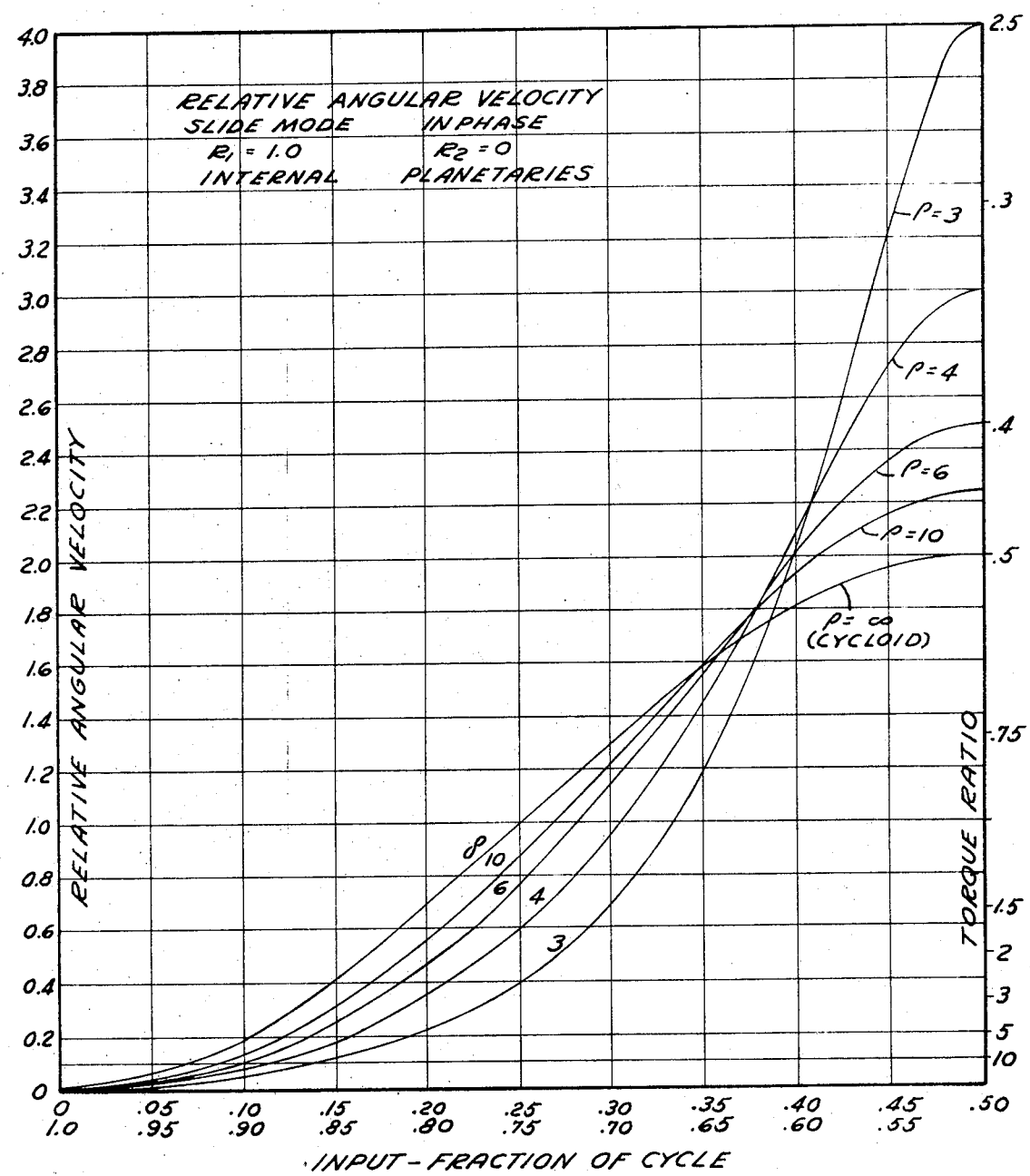

FIG. 22, a series of curves showing relative angular velocities for a slide mode, in-phase system with internal planetaries.

Figure 23:
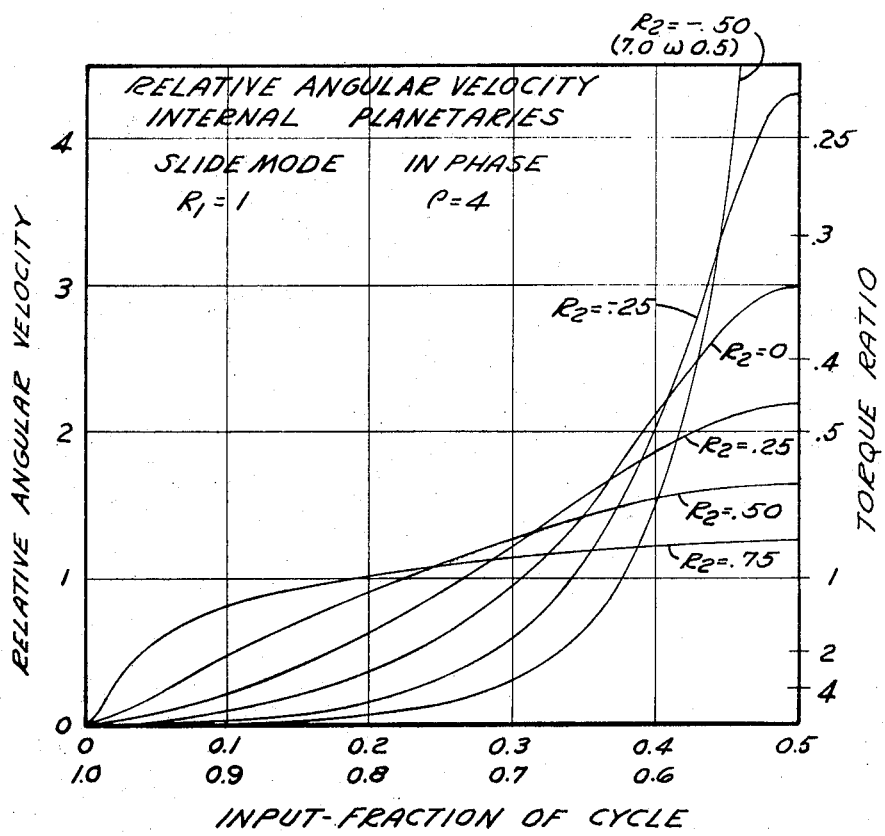

FIG. 23, a series of curves showing relative angular velocities for a slide mode, in-phase system with internal planetaries with a radius of 4.

Figure 24:
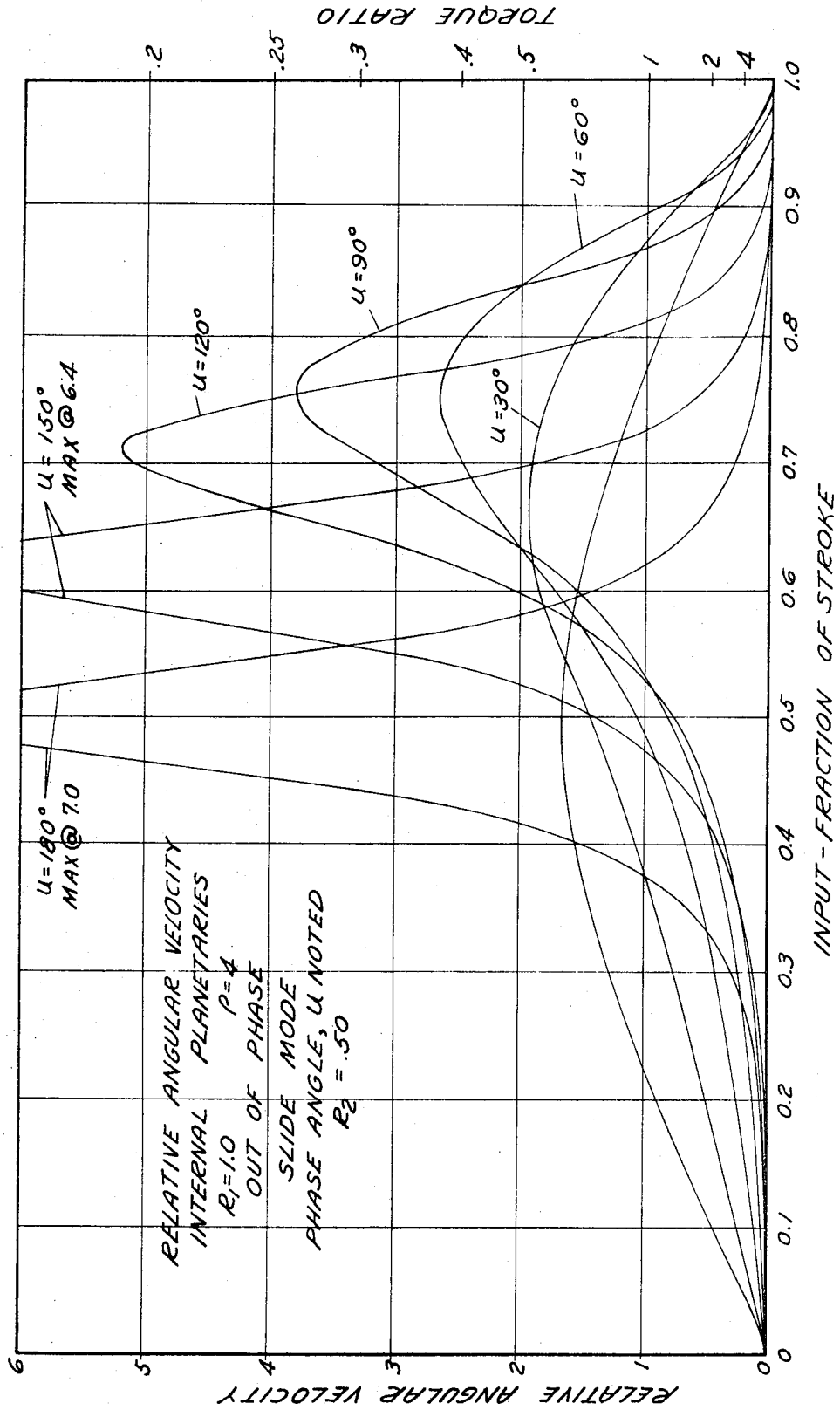

FIG. 24, a series of curves showing relative angular velocities for an out-of-phase, slide mode, internal planetary system wherein the parameter $R_2$ is 0.50 and the radius of the planetary is 4.

Referring to FIGS. 1 and 2, a case 10, consisting of an essentially circular weldment or casting, is the frame to which three sets of rotating members are attached. In the specific arrangement shown, the output member consists of a turntable 12 attached to the case 10 through output bearing 14. The inner race of the bearing 14 is clamped to the case 10 by clamp ring 16, while the outer race is clamped to the turntable through spacer 18 and clamp ring 20.

The turntable 12 is indirectly driven by a family of planetary gears. Six such identical planetary gears are shown in the drawings, FIGS. 1 and 2, but it will be understood that this number is arbitrary and can be increased or decreased within reasonable limits to meet the load requirements of the application.

On the underside of the turntable are mounted six pairs of drive bars 22, section B—B, FIG. 2. Into the slot formed by each pair of these drive bars 22 is slidably mounted a guide block 24, which is in turn rotatably connected to an output eccentric 26, integral with or bolted to a planetary gear 28. The distance from the centerline of each eccentric 26 to the centerline of each planetary gear 28 may vary from design to design from 0 to slightly more than the pitch radius of the planetary gear 28. This is later referred to as dimension $R_1$.

Each planetary gear 28 is guided by two bearings 30 and 32 mounted, FIG. 1, section G—G, in a planetary carrier assembly consisting of the lower ring plate 34, the upper ring plate 36, and six spacers 38. The lower ring plate in turn is connected to the case 10 through bearing 40 which thereby guides the entire planetary carrier assembly 34, 36 and 38.

Each of the planetary gears 28 is suitably formed to mesh with a stationary sun gear 42 which is rigidly bolted to the case 10. It can be seen, therefore, that when the planetary carrier assembly 34, 36 and 38 is rotated on its bearing 40, through means described below, the planetary gears 28 are caused to rotate about their individual centerlines, as well as revolving about the sun gear 42. This in turn causes the output eccentrics 26 to drive the turntable 12 through guide blocks 24 and drive bars 22. It will be further seen that the motion of the turntable 12 will be of an intermittent nature depending on the eccentricity of the output eccentric 26 relative to the pitch radius of the planetary gear 28.

An input eccentric 44 is integral with or bolted to each planetary gear 28. Each input eccentric 44 is rotatably connected to a slide block 46 which is slidably mounted in a slot 48 in the input driver ring 50, FIG. 2, Section F—F. This input driver ring 50 is supported from the case 10 through bearing 52, which is fastened to the case 10 by clamp ring 54, and clamped to the input driver ring 50 by clamp ring 56. The distance from the centerline of each planetary gear 28 to the centerline of each input eccentric 44 may vary from design to design from 0 to slightly less than the pitch radius of the planetary gear 28. This dimension is later referred to as $R_2$.

It will be seen that as the input driver ring is rotated on its support bearing 52, the planetary gears 28 and the planetary carrier assembly 34, 36 and 38 are driven through the slots 48, the slide blocks 46, and the input eccentrics 44. The characteristics of motion of the planetary carrier assembly 34, 36 and 38 relative to the driver ring 50 are determined by the amount of eccentricity of the input eccentrics 44.

Therefore, the rotation of the driver ring 50 causes an intermittent rotation of the turntable 12, and the characteristics of the turntable 12 movement are dependent on the eccentricities of both the input and output eccentrics relative to the centers of the planetary gears.

In the drawings presented in FIGS. 1 and 2, the input and output eccentrics are shown as lying in the same radial plane of each planetary gear. The output characteristics of the turntable may be further controlled by introducing an angle between the radial plane that contains the input eccentric and the radial plane that contains the output eccentric. The effect of these quantities, input eccentricity, output eccentricity, and phase angle between them, will be analyzed in the kinematic section below.

The input driver ring 50 may be driven by one of a variety of conventional systems among which are: a worm driving against the outside surface of the driver ring 50 into which appropriate worm wheel teeth have been cut; a small pinion 51 on a drive shaft 51A driving against the outside surface of the driver ring 50 into which appropriate mating gear teeth have been cut (FIG. 2); a chain or belt drive engaging suitable sprocket teeth or belt grooves in the driving ring 50; a cylinder drive through a pawl and ratchet arrangement, the ratchet member being attached to or integral with the driver ring 50; for oscillatory as opposed to unidirectional indexing, a cylinder output rod may be directly pin connected to the driver ring 50.

In the design presented in FIGS. 1 and 2, the planetary gears were shown operating around a stationary sun gear creating an external planetary design. An alternate design in which the planetary gears operate within a stationary internal gear is next described; this is referred to as an internal planetary design.

Referring to FIGS. 3 and 4, a case 60, consisting of an essentially circular weldment or casting, is the frame to which three sets of rotating members are attached. In the specific arrangement shown, the output member consists of a turntable 62 attached to the case 60 through output bearing 64. The outer race of the bearing 64 is clamped to the case 60 by clamp ring 66, while the inner race of the bearing 64 is clamped to the turntable 62 through spacer 68 and clamp 70.

The turntable 62 is indirectly driven by a family of planetary gears. Six such identical planetary driver gear assemblies are shown in the drawings, FIGS. 3 and 4, but it will be understood that this number is arbitrary and can be increased or decreased within reasonable limits to meet the load requirements of the application.

On the underside of the turntable are mounted six pairs of drive bars 72 (FIG. 4, section B—B). Into the slot formed by each such pair of these drive bars 72 is slidably mounted a guide block 74 which is rotatably connected to an output eccentric 76 integral with or bolted to a planetary gear 78. The distance from the center of each eccentric 76 to the center of each planetary gear 78 may vary from design to design from 0 to slightly more than the pitch radius of a planetary gear 78. This is later referred to as $R_1$.

Each planetary gear 78 is guided by two bearings 80 and 82 mounted in a planetary carrier assembly consisting of the lower ring plate 84, the upper ring plate 86, and six spacers 88. The lower ring plate 84 in turn is connected to the case 60 through bearing 90 which guides the entire planetary carrier assembly 84, 86 and 88.

Each of the planetary gears 78 is suitably formed to mesh with a stationary internal gear 92 which is rigidly bolted to the case 60. It can be seen, therefore, that when the planetary carrier assembly 84, 86 and 88 is rotated about its bearing 90, by means described below, the planetary gears 78 are caused to rotate about their individual centerlines, as well as revolving within the internal gear 92. This in turn causes the output eccentrics 76 to drive the turntable 62 through guide blocks 74 and drive bars 72. It will be further seen that the motion of the turntable 62 will be of an intermittent nature depending on the eccentricity of the output eccentrics 76 relative to the pitch radius of the planetary gears 78.

An input eccentric 94 is bolted to or integral with each planetary gear 78. Each input eccentric 94 is rotatably connected to a slide block 96 which is slidably mounted in a slot 98 in the input driver ring 100 (FIG. 4, section F—F). This input driver ring 100 is supported from the case 60 through bearing 102 which is clamped to the case 60 by clamp ring 104 and clamped to the input driver ring 100 by clamp ring 106. The distance from the centerline of each input eccentric 94 to the centerline of each planetary gear 78 may vary from design to design from 0 to slightly less than the pitch radius of a planetary gear 78. This is later referenced as dimension $R_2$.

It will be seen that as the input driver ring 100 is rotated on its support bearing 102, the planetary gears 78 and the planetary carrier assembly 84, 86 and 88 are driven through the slots 98, the slide blocks 96, and the input eccentrics 94. The characteristics of motion of the planetary carrier assembly 84, 86 and 88 relative to the driver ring 100 are determined by the amount of eccentricity of the input eccentrics 94. Therefore, the rotation of the driver ring 100 causes a rotation of the turntable 62, and the characteristics of the turntable 62 output movement are dependent on the eccentricities of both the input and output eccentrics relative to the centers of the planetary gears.

In the drawings presented in FIGS. 3 and 4, the input and output eccentrics are shown as lying in the same radial plane of each planetary gear. The output characteristics of the turntable may be further controlled by introducing an angle between the radial plane that contains the input eccentric and the radial plane that contains the output eccentric. The effect of these quantities, input eccentricity, output eccentricity, and the phase angle between them, will be analyzed in the kinematic section below.

The input driver ring 100 may be driven by any one of the systems of input means described in connection with the input driver ring 50 shown in FIGS. 1 and 2.

Both mechanisms described above are comparable in three fundamental respects: in each case the output member is an open center turntable; the coupling system between the input member and the input eccentrics is through straight radial slots in the input member; and the coupling between the output member and the output eccentrics is also through straight radial slots created by bars on the output member. In the mechanisms described below, two different examples of alternate design are presented.

Referring to FIGS. 5, 6, 7, 8, 9 and 10, the mechanism is housed in a two-piece case 110 and 112. Suitable mounting feet or other attachment points may be appended to this case as required. An input shaft 114 is mounted in suitable bearings 116 housed in case half 110. A seal 118 and bearing retainer nut 120 of conventional design are applied as shown. An input spider 122, FIG. 8, is welded or otherwise suitably attached to the input shaft 114.

In the mechanism shown, four identical planetary gears are incorporated. It will be understood that this number is arbitrary and that the number of planetary gear assemblies utilized in any given design may be varied within reasonable limits to meet the specific load requirements.

Each arm of the input spider 122 is pivot connected to an input link 124 through a pin 126. The other end of each such input link 124 is connected through bearing 128 to an input eccentric 130 which is integral with or bolted to a planetary gear 132.

The planetary gears 132 are mounted in bearings 134 and 136 which are housed in a planetary carrier assembly which consists of a primary plate 138, a secondary plate 140, and a spacer 142. This three-piece assembly is rigidly bolted or otherwise fastened into a single unit which is supported by bearing 144 mounted in the case half 110.

The planetary gears 132 are suitably formed to mesh with a stationary internal gear 146 which is bolted between to case halves 110 and 112. The distance (dimension $R_2$ later referenced) from the centerline of each input eccentric 130 to the centerline of each planetary gear 132 may vary from design to design and may range in value from 0 to slightly less than the pitch radius of a planetary gear 132.

It will be seen that as the input shaft is rotated (114), the input spider 122 rotates with it. This in turn causes the input links 124 and input eccentrics 130 to drive the planetary gears 132 and planetary carrier assembly 138, 140, and 142, which rotates on its bearing 144, while the planetary gears also rotate about their own axes in bearings 134 and 136. It will be further seen that the rotation of the planetary carrier assembly 138, 140 and 142 will be of a non-uniform nature relative to the input spider 122, and that the degree of non-uniformity of rotation will be dependent upon the amount of eccentricity of the input eccentrics 130 relative to the planetary gears 132. This non-uniformity of rotation will also be dependent to a lesser degree upon the lengths of the input links 124.

An output shaft 148 is suitably supported in bearings 150 mounted in case half 112. A seal 152 and bearing retainer nut 154 are applied in a conventional manner as shown. An output spider 156 (FIG. 7) is integral with or suitably rigidly fastened to the output shaft 148; to each arm of this output spider 156 is attached an output link 158 through a pin 160. The other end of each output link 158 is connected through a bearing 162 to an output eccentric 164 which is bolted to or integral with each planetary gear 132. The distance (dimension $R_1$ later referred to) from the centerline of an output eccentric 164 to the centerline of a planetary gear 132 on which it is mounted may vary from design to design and may range in value from 0 to slightly more than the pitch radius of a planetary gear 132.

It will be seen that the rotation of the planetary carrier assembly 138, 140 and 142 about bearing 144 and the rotation of the planetary gears 132 about their own axes will cause a non-uniform rotation of the output spider 156 and output shaft 148. It will be further seen that this non-uniformity of rotation of the output spider 156 and output shaft 148 will be dependent upon the amount of eccentricity of the output eccentrics 164 relative to their supporting planetary gears 132, and to a lesser degree dependent upon the lengths of the output links 158.

Therefore, a rotation of the input shaft 114 causes a rotation of the output shaft 148 through the intermediate action of the input links 124, input eccentrics 130, planetary gears 132, output eccentrics 164, and output links 158. But for a given uniform rotation of the input shaft 114, the rotation of the output shaft will be non-uniform, with the non-uniformity dependent upon the input eccentricity, the output eccentricity, and the lengths of both the input links 124 and the output links 158.

In the mechanism shown in the drawings, FIGS. 5 to 10, the input and output eccentrics were again shown as lying in the same radial plane of a given planetary gear. It will be understood that this need not be the case as has been described in connection with the prior examples.

In the mechanism presented in FIGS. 5 to 10, the coupling between the input shaft and the planetary gears is through links; similarly, the connection between the planetary gears and the output shaft is also through links. This system is defined as the link mode as opposed to the slide mode illustrated in FIGS. 1 to 4. In some applications, it may be advantageous to use a combination of these modes, i.e., a link mode coupling between the input shaft and the planetary gears in combination with a slide mode coupling between the planetary gears and the output shaft, or vice versa. Such a system is defined as a hybrid system.

The mechanism shown in FIGS. 5 to 10 utilizes a stationary internal gear to operate with the planetary gears. An alternate version of a link mode mechanism utilizing a stationary sun gear to operate the planetary gears is shown in FIGS. 11 to 14.

Referring to FIGS. 11 to 14, the mechanism is housed in a three-piece case consisting of frame 170, input bell 172, and output bell 174. An input shaft 176 is mounted in bearings 178 housed in input bell 172; this assembly is retained in the input bell 172 with bearing nut 180, and a seal 182 is mounted in a cover 184 also bolted to the input bell 172.

The inner end of the input shaft 176 carries a pinion gear 186 suitably formed to mesh with an input gear 188, mounted through bearings 190 to a stationary shaft 192 which in turn is rigidly supported by the input bell 172 and the output bell 174.

In the mechanism shown, four identical planetary gear assemblies are incorporated. It will be understood, as with previous mechanisms, that this number is arbitrary, and that the number of planetary gear assemblies utilized in any given design may be varied within reasonable limits to meet the specified load requirements.

Four input spider arms 194, FIG. 12, are bolted to the inner face of the input gear 188; an input link 196 is pivot connected to each input spider arm 194 through a pin 198. The other end of each input link 196 is rotatably connected through bearing 200 to an input eccentric 202 which is integral with or bolted to a planetary gear 204. The distance (dimension $R_2$ later referenced) from the centerline of each input eccentric 202 to the centerline of the planetary gear 204 on which it is mounted may again vary from design to design and may range in value from 0 to slightly less than the pitch radius of a planetary gear 204.

The planetary gears 204 are mounted in bearings 206 and 208 which are housed in a planetary carrier assembly which consists of a primary plate 210, a secondary plate 212, and four spacers 214. This three-piece assembly is rigidly bolted or otherwise fastened into a single unit which is supported by bearing 216 mounted on the stationary shaft 192. The planetary gears 204 are suitably formed to mesh with a stationary sun gear 217 which is rigidly mounted on the stationary shaft 192.

It will be seen that as the input gear 188 is rotated by the input shaft 176, the spider arms 194, coupled to the planetary gears 204 through the input links 196 and input eccentrics 202, cause the planetary carrier assembly 210, 212 and 214 to rotate about their own axes on bearings 206 and 208. It will be further seen that the rotation of the planetary carrier assembly 210, 212 and 214 will be of a non-uniform nature relative to input gear 188, and that the degree of non-uniformity of rotation will be dependent upon the amount of eccentricity of the input eccentrics 202 relative to the planetary gears 204. This non-uniformity will also be dependent to a lesser degree upon the lengths of the input links 196.

An output ring gear 218 is mounted to the stationary shaft 192 through bearings 220. Four spider arms 222, FIG. 14, are rigidly attached to one face of the output ring gear 218. The outboard ends of the spider arms 222 are pivot connected to the output links 224 through pins 226. The other end of each output link 224 is in turn connected through a bearing 228 to an output eccentric 230 which is bolted to or integral with each planetary gear 204. As before, the distance (dimension $R_1$ later referenced) from the centerline of each output eccentric 230 to the centerline of the planetary gear 204, on which it is mounted, may vary from design to design, and may range in value from 0 to slightly more than the pitch radius of a planetary gear 204.

The output ring gear 218 is suitably formed to mesh with the output pinion 232 which is integral with or suitably fastened to the output shaft 234, which in turn is mounted in bearings 236 housed in the output bell 174. The output shaft assembly is retained by bearing nut 238 and sealed by seal 240 mounted in seal housing 242 which is bolted to the output bell 274.

It will be seen that the rotation of the planetary carrier assembly 210, 212, 214 about bearing 216, and the rotation of the planetary gears 204 about their own axes, will cause a non-uniform rotation of the output ring gear 218. It will be further seen that this non-uniformity of rotation of the output ring 218 will be dependent upon the amount of eccentricity of the output eccentrics 230 relative to their supporting planetary gears 204, and to a lesser degree dependent upon the lengths of the output links 224.

Therefore, a rotation of the input shaft 176 causes a non-uniform rotation of the output shaft 234 through the intermediate action of the input gear 188, input spider arms 194, input links 196, input eccentrics 202, planetary gears 204, output eccentrics 230, output links 224, output spider arms 222, and output gear 218. The non-uniformity of rotation of the output shaft 234 relative to the input shaft 176 is a function of the input eccentricity, the output eccentricity, and the lengths of both the input links 196 and the output links 224.

In the mechanism shown in the drawings, FIGS. 11 to 14, the input and output eccentrics were again shown as lying in the same radial plane of a given planetary gear. It will be understood that this need not be the case as has been described in connection with the prior examples.

It will be noted that the mechanism of FIGS. 11 to 14 is a link mode system as was the mechanism of FIGS. 5 to 10. However, the mechanism of FIGS. 11 to 14 utilizes a stationary sun gear operating with external planetary gears, as opposed to the mechanism of FIGS. 5 to 10 which utilizes a stationary internal gear operating with internal planetary gears.

In the four illustrative mechanisms shown, various combinations of features were employed. It will be understood that these combinations were shown for purposes of example only, and other combinations may also be utilized, e.g., the direct shaft input may be utilized with a slide mode system, or a reduction shaft input may be combined with a table type output. The various features may be cross combined as required to meet specific applications.

In addition, other important alternative designs, by way of example, are noted below.

In many cases, the large kinematic flexibility inherent in the overall system is not required, and it becomes possible to eliminate the input eccentrics and their associated drive elements. This is the equivalent of having the eccentricity of the input eccentrics equal to 0. In such an arrangement, there are available a variety of different input means among which are: a direct connection between the planetary carrier assembly and the input shaft; a reduction gear connection between the planetary carrier assembly and the input shaft pinion; in the case of an external planetary system, the introduction of an internal gear, which meshes with all planetary gears and therefore drives them with a constant speed reduction, with this internal gear either driven directly by the input shaft, or driven through a reduction gear set; in the case of an internal planetary system, the introduction of a sun gear which meshes with all planetary gears and therefore drives them with a constant speed reduction, with this sun gear either directly driven by the input shaft, or driven through a reduction gear set.

In the slide mode systems as shown in the mechanisms of FIGS. 1 to 4, the slots in both the input and output members were shown as being straight and radial with respect to the axes of rotation of the input and output members. Still greater kinematic flexibility can be achieved by making these slots straight and nonradial, or curved with a constant or variable radius of curvature.

In the link mode systems as shown in the mechanism of FIGS. 5 to 14, the pivot connections between the input and output links and their associated spider arms were shown as lying on a line tangent to the locus circle of the centers of the planetary gears at the point of intersection with a radial line from the center of the planetary gear set, which contains both the center of a given planetary and the center of the associated eccentric. This too may be changed to achieve certain mechanical and kinematic objectives.

In order to make a qualitative analysis of the foregoing systems, the following assumptions and definitions are presented:

1. It is assumed that the input shaft rotates at a constant angular velocity.
2. The distance from the center of a given planetary gear to the center of the input eccentric mounted thereon is defined as the input radius.
3. The distance from the center of a given planetary gear to the center of the output eccentric mounted thereon is defined as the output radius.

The first analysis of a slide mode system, in which the slots are straight and radial, will be made on the further assumption that the input radius is zero, i.e., the input eccentrics are concentric with their respective planetary gears. Under these conditions, it will be seen that the planetary carrier assembly will rotate at the same constant speed as the input spider, and that the planetary gears will rotate on their own axes at a different constant speed dependent on their size relative to the stationary gear with which they are in mesh.

Under these conditions, and assuming that each output eccentric is displaced some distance from the centerline of its planetary gear, it can be seen that:

When the output eccentrics lie between the centers of the planetary gears and the stationary gear with which they are in mesh (either internal gear or sun gear) the output angular velocity is less than the input angular velocity.

When the output eccentrics lie on the other side of the centers of the planetary gears from the side on which they are in mesh, the output angular velocity is greater than the input angular velocity.

The output velocity moves through one cycle for each revolution of a planetary gear relative to its stationary mating gear, reaching a maximum or minimum when the center of the output eccentric, center of the planetary gear, and mesh point are in line; maximum when the planetary center lies between the point of mesh and the center of the output eccentric, and minimum when the center of the output eccentric lies between the planetary gear center and the point of mesh. The output velocity changes smoothly between its maximum and minimum.

The amplitude of the difference between the maximum and minimum velocities increases with increases in the output radius, until, when the output radius is made equal to the pitch radius of a planetary gear, a momentary stop is attained in the output velocity at the minimum point when the center of the output eccentric is momentarily coincident with the point of mesh. The corresponding maximum is less than twice the input velocity in an external planetary system, and more than twice the input velocity in an internal planetary system.

When the output radius becomes greater than the pitch radius of a planetary gear, there is a reversal of the output velocity for a portion of the cycle. This is a useful property in lengthening the practical dwell.

These foregoing characteristics apply strictly only to the slide mode system with straight radial slots. It can be seen, however, that with a link mode system, the characteristics are generally the same, except that the oscillation of the links adds a slight additional variation, which is dependent upon the link length and the location of the pivot connection to the output spider.

When the input eccentrics are not concentric with the planetary gears, the velocity relationship between the input spider and the planetary carrier is the exact reciprocal of the relationship described above between the planetary carrier and the output spider. It should be noted that if the input radius were to be made as large as the pitch radius of the planetary gear, a theoretically infinite velocity of the planetary carrier would result. Therefore, the input radius must be kept slightly smaller than the pitch radius of the planetary gears. This reciprocal relationship is of great value in adjustment of the characteristics of the overall system.

The effects of the input and the output system are cumulative. Furthermore, since the input and output eccentrics may be radially and angularly displaced with respect to each other, an extraordinarily wide variation in output characteristics may be achieved through the knowledgeable choice of the three basic parameters: input radius, output radius, and the phase angle between them.

The number of velocity cycles per revolution is determined by the ratio of the pitch diameter of the stationary gear to the pitch diameter of the planetary gears. In the case of external planetaries, there is no theoretical limit to this ratio. In the case of internal planetaries, a discontinuity arises when the planetary pitch diameter is half the internal gear pitch diameter and the output radius equals the pitch radius of the planetary gear.

With reference to the kinematic development, several specific terms require definition. In the accepted sense, angular velocity means the rate of change of angular position with respect to time and will be so used in this disclosure; similarly, angular acceleration means the rate of change of angular velocity with respect to time and will be so used in this disclosure.

In the mechanism described herein, the angular velocity and the angular acceleration characteristics of the output are dependent not only on the mechanism but on the angular velocity and angular acceleration characteristics of the input. For most applications, the input will be moved at a nominally constant angular velocity, except for the extreme ends of the movement; therefore, the output angular velocity and angular acceleration characteristics will be calculated on the basis of an assumed constant angular velocity input. The term relative angular velocity is defined for the purposes of this disclosure as the angular velocity of the output assuming a constant input angular velocity; and the term relative angular acceleration is defined for the purposes of this disclosure as the angular acceleration of the output again assuming a constant input angular velocity.

If the input does not move at a constant angular velocity, transfer functions are stated which describe the output angular velocity as a function of the input angular velocity, and other transfer functions are stated which describe the output angular acceleration as a function of the input angular velocity and input angular acceleration.

The output angular displacement characteristics relative to the input angular displacement are, of course, unaffected by either the angular velocity or angular acceleration of the input.

In the kinematic analysis which follows, the following symbols will be consistently used and are defined as follows:

$R$ = Pitch radius of the planetary gear, which is taken as 1 for all analyses unless otherwise noted.

$\rho$ = Pitch radius of the stationary gear; this is the sun gear in an external planetary system, and is the internal gear in an internal planetary system.

$R_1$ = Radial distance from the center of the planetary gear to the center of the output eccentric.

$R_2$ = Radial distance from the center of the planetary gear to the center of the input eccentric.

$\phi$ = Output angular displacement (of output spider) from its initial position.

$\psi$ = Input angular displacement (of input spider) from its initial position.

$\theta$ = Angle through which the planetary gear has rotated from its initial position. The initial position of the planetary gear is taken at that point where the radial line between the center of the planetary gear and the center of the stationary gear contains the center of the output eccentric, and the center of the output eccentric is at its closest position to the point of pitch line tangency.

$u$ = Phase angle between the planetary gear radial line which contains the center of the input eccentric and the planetary gear radial line which contains the center of the output eccentric. It is defined as positive if the input eccentric radial line is leading the output eccentric radial line in the direction of planetary gear rotation.

$V_t$ = True angular velocity of the output = $d\phi/dt$ $V$ = Relative angular velocity of the output = $d\phi/d\psi$ $A_t$ = True angular acceleration of the output = $d^2\phi/dt^2$ $A$ = Relative angular acceleration of the output = $d^2\phi/d\psi^2$ In this and all subsequent analyses, the angular displacement for both the input and output are most conveniently expressed in terms of $\theta$, which becomes a calculating parameter. Expressing the output angle $\phi$ directly in terms of the input angle $\psi$ is generally an extremely cumbersome procedure. Therefore, it is also far more convenient to differentiate with respect to $\theta$ as required to obtain the solutions for relative angular velocity and relative angular acceleration. It can be shown for a general case, that if $\phi$ is some function of $\theta$, $\phi = f(\theta)$, and $\psi$ is some other function of $\theta$, $\psi = g(\theta)$, then $d\phi/d\psi$ and $d^2\phi/d\psi^2$ can be expressed as derivatives with respect to $\theta$ as follows:

$$V = \frac{d\phi}{d\psi} = \frac{\frac{d\phi}{d\theta}}{\frac{d\psi}{d\theta}} \quad (1)$$

$$A = \frac{d^2\phi}{d\psi^2} = \frac{\frac{d\psi}{d\theta}\frac{d^2\phi}{d\theta^2} - \frac{d\phi}{d\theta}\frac{d^2\psi}{d\theta^2}}{\left(\frac{d\psi}{d\theta}\right)} \quad (2)$$

These relationships will be used repeatedly and will be referred to as equation (1) and equation (2), as parenthetically noted.

It will be noted that the quantity $d\psi/d\theta$ appears in the denominator of the expressions for both V and A. Mathematically, this means that the expressions become indeterminate at points where $d\psi/d\theta$ becomes zero and such points must be avoided. Practically, this means that a point of infinite mechanical disadvantage arises for the input and the mechanism will not move. Accordingly, such points will also be avoided.

Another valuable characteristic for investigation is the torque ratio of the output relative to the input, i.e., the units of output torque generated for each unit of input torque. Assuming a negligible friction in the system, the torque ratio is the reciprocal of the relative angular velocity. This is proven as follows:

Work in = Work out $T_i$ = Input Torque $T_o$ = Output Torque $T_i \times d\psi = T_o \times d\phi$ $T_o/T_i = d\psi/d\phi = 1/V$ All relative angular velocity graphs are therefore marked with a second scale indicating the torque ratio of output to input.

Referring to FIG. 15, which is a kinematic line drawing for a slide mode external gear system; only the output system is shown, i.e., the output angle $\phi$ is related to the planetary angle $\theta$.

It can be seen that after the planetary gear has been rotated by the input through an angle $\theta$ from an initial starting position in which the radius $R_1$ was colinear with the line connecting the center of the planetary gear with the center of the sun gear, the following angular displacement relationship exists:

$$\phi = \frac{\theta}{\rho} - \arctan \frac{R_1 \sin \theta}{\rho + 1 - R_1 \cos \theta} \quad (3)$$

By differentiating this expression with respect to $\theta$, the following expression is obtained:

$$\frac{d\phi}{d\theta} = \frac{(\rho+1)[\rho+1+R_1^2-(\rho+2)R_1 \cos \theta]}{\rho[(\rho+1)^2+R_1^2-2R_1(\rho+1) \cos \theta]} \quad (4)$$

By differentiating again with respect to $\theta$, the following expression is obtained:

$$\frac{d^2\phi}{d\theta^2} = \frac{R_1(\rho+1)[(\rho+1)^2-R_1^2] \sin \theta}{[(\rho+1)^2+R_1^2-2R_1(\rho+1) \cos \theta]^2} \quad (5)$$

These three equations, (3), (4), and (5) have to do with the relationships of the output angle $\phi$ and the planetary angle $\theta$. To obtain the input-output relationship, the input system is now examined.

Referring to FIG. 16, which is a kinematic line drawing for a slide mode external gear system, showing the input system, which relates the input angle $\psi$ to the planetary angle $\theta$. It will be noted that this is identical with FIG. 15, except for the terminology of the parameters. It can be seen that after the planetary gear has been rotated through an angle $\theta$ from an initial starting position in which the radius $R_2$ was colinear with the line connecting the center of the planetary gear with the center of the sun gear, the following angular displacement relationship exists: if $\theta_i = \theta \ (\mu = 0)$:

$$\psi = \frac{\theta}{\rho} - \arctan \frac{R_2 \sin \theta}{\rho + 1 - R_2 \cos \theta} \quad (6)$$

By differentiating this expression with respect to $\theta$, the following expression is obtained:

$$\frac{d\psi}{d\theta} = \frac{(\rho+1)[\rho+1+R_2^2-(\rho+2)R_2 \cos \theta]}{\rho[(\rho+1)^2+R_2^2-2R_2(\rho+1) \cos \theta]} \quad (7)$$

By differentiating again with respect to $\theta$, the following expression is obtained:

$$\frac{d^2\psi}{d\theta^2} = \frac{R_2(\rho+1)[(\rho+1)^2-R_2^2] \sin \theta}{[(\rho+1)^2+R_2^2-2R_2(\rho+1) \cos \theta]^2} \quad (8)$$

These three equations, (6), (7), and (8) have to do with the relationships of the input angle $\psi$ and the planetary angle $\theta$. In this case where the planetary radii $R_1$ and $R_2$ are colinear, and therefore the measure of $\theta$ is the same for both the input and the output conditions, the relative angular velocity of the output is obtained by substituting equations (4) and (7) into equation (1), which after simplication results in the following expression:

$$V = \frac{d\phi}{d\psi} = \frac{\frac{\rho+1+R_1^2-(\rho+2)R_1 \cos \theta}{(\rho+1)^2+R_1^2-2R_1(\rho+1) \cos \theta}}{\frac{\rho+1+R_2^2-(\rho+2)R_2 \cos \theta}{(\rho+1)^2+R_2^2-2R_2(\rho+1) \cos \theta}} \quad (9)$$

To obtain the expression for the relative angular acceleration, equations (4), (5), (7), and (8) may be substituted into equation (2), but the resultant algebraic expression becomes so cumbersome that it is more convenient to accomplish the specific calculations by evaluating each derivative independently and then substituting their values into equation (2) to obtain the relative angular acceleration. This technique is more acceptable because it is ordinarily desired to evaluate the $\theta$ derivatives independently in any case. For simplification of these operations, equation (2) may be rewritten:

$$A = \frac{d^2\phi}{d\psi^2} = \frac{\frac{d^2\phi}{d\theta^2}}{\left(\frac{d\psi}{d\theta}\right)^2} - \frac{\frac{d\phi}{d\theta}\frac{d^2\psi}{d\theta^2}}{\left(\frac{d\psi}{d\theta}\right)^3} \quad (2a)$$

Equation (3) expresses the output angular position; equation (6) expresses the input angular position; equation (9) expresses the relative angular velocity; and when equations (4), (5), (7), and (8) are substituted into equation (2) or (2a), the expression for the relative angular acceleration is obtained. In all cases $\theta$ is a calculating parameter. For every arbitrary value of $\theta$, there can be calculated a corresponding value of $\phi$, $\psi$, $d\phi/d\psi$, and $d^2\phi/d\psi^2$. Therefore, for every value $\psi$ so obtained, there is a corresponding value of $\phi$, $d\phi/d\psi$, and $d^2\phi/d\psi^2$. It is with these relationships that we are concerned. In other words, $\theta$ was used only as a mathematical convenience; and the output angular position, relative angular velocity, and relative angular acceleration will be shown in terms of the input angular position, $\psi$.

Furthermore, since the input angular position change or angular displacement, for one acceleration cycle of the output, may vary in terms of the absolute angle in degrees, the input angular displacement will be expressed in terms of INPUT-FRACTION OF CYCLE. A cycle is defined as one revolution of the planetary gear relative to the stationary gear, with the end points of the cycle defined as those points where the output radius $R_1$ is colinear with the line connecting the center of the planetary gear and the center of the stationary gear, and the center of the output eccentric at its closest position to the point of gear tangency. These generalizations apply to all subsequent analyses.

In this and all subsequent variations, only the relative angular velocity curves will be presented, since these curves may be interpreted to indicate the angular displacement, and angular relative acceleration information in a comparative sense. It will be understood that the area under the relative angular velocity curve up to a given point is a measure of the angular displacement up to that point, and that the slope of the relative angular velocity curve at any point is a measure of the relative angular acceleration at that point. Judicious and knowledgeable examination of the relative angular velocity curves reveals both angular displacement and relative angular acceleration information.

In the special but important case where $R_2 = 0$, i.e., the eccentricity of the input eccentrics is 0, and the input eccentrics are concentric with the axis of the planetary gears, the input spider and the planetary carrier move in unison. In such cases the input spider and the input eccentrics may be physically deleted and the planetary carrier driven directly, i.e., the planetary carrier becomes the input means. When $R_2 = 0$, equation (9) simplifies to the following:

$$V=\frac{d\phi}{d\psi}=(\rho+1)\frac{\rho+1+R_1^2-(\rho+2)R_1 \cos \theta}{(\rho+1)^2+R_1^2-2R_1(\rho+1)\cos \theta} \quad (9a)$$

The relative angular velocity curves resulting from this equation (9a) for $R_1 = 1$, and for various values of $\rho$ are shown in FIG. 19. It will be remembered that this is for the condition where the output spider has straight radial slots and that the planetary gears operate externally around a stationary sun gear, i.e., slide mode external planetaries. It will be noted that the relative angular velocity characteristics of the system are dependent on $\rho$, and while curves start and end at 0 and reach the axis with zero slope at each end of a cycle; their behavior is interestingly different for different values of $\rho$. For $\rho =1$, the relative angular velocity increases rapidly at the beginning of the stroke, then levels off and reaches a maximum value of 1.33 at midstroke; practically, this means that the maximum angular velocity at the center of the travel for the output is 1.33 times the (constant) input angular velocity. All curves are, of course, symmetrical about the center of a cycle. At larger values of $\rho$ the relative angular velocity increases less rapidly at the start of the cycle, and the maximum relative angular velocity reached at midcycle becomes larger, until, as $\rho$ approaches infinity, the maximum relative angular velocity at mid-cycle approaches 2.

The relative angular velocity curves resulting from the more general equation (9), whereby in $R_2 \neq 0$, are shown in FIG. 20. It will be understood that these curves are shown by way of illustration to indicate the effect of the parameter $R_2$ for a representative fixed condition for the other parameters, in which $\rho = 4$, and $R_1 = 1$. It will be noted that the curve for $R_2 = 0$ in FIG. 20 is identical with the curve in FIG. 19 in which $\rho = 4$.

It will further be noted that for all values of $R_2$, the curves are symmetrical about the midpoint of the cycle, and that all curves still reach the axis with zero slope at the ends of the cycle. As $R_2$ is made more positive, the relative angular velocity rises more rapidly from the ends of the cycle, and becomes "flatter" during the center of the cycle, and reaches a lower peak value at mid-cycle. Conversely, if $R_2$ is made increasingly negative, the opposite behavior of the relative angular velocity curves is noted; i.e., the relative angular velocity increases more slowly from the ends of the cycle, but reaches a higher mid-cycle value, with a short duration of such higher value.

Therefore, while still maintaining symmetrical conditions about the midpoint of the cycle, a very high degree of versatility and control can be obtained by judicious and knowledgeable choice of the $R_2$ parameter.

These effects, while shown only for the single condition where $\rho = 4$, and $R_1 = 1$, apply also for other values of $\rho$, although it will be understood that the "base" curve, where $R_2 = 0$, is different for each different value of $\rho$.

The foregoing represent the characteristics of a slide mode, in phase, external planetary system. To obtain the characteristics of a slide mode, out of phase, external planetary system, the following techniques are used. Referring again to FIG. 16 and the equations derived therefrom, i.e., equations (6), (7), and (8), it can be seen that if $\theta_i$ in FIG. 16 is displaced from the $\theta$ shown in FIG. 15, such that:

$$\theta_i = \theta + u$$

where $u$ is a constant angle defined as a phase angle between the radius $R_1$ and the radius $R_2$ such that it is positive if $R_2$ leads $R_1$ in the direction of planetary gear rotation; then the relationships existing between $\psi$ and $\theta$ by successive differentiation become:

$$\psi=C+\frac{\theta+u}{\rho}-\arctan\frac{R_2 \sin (\theta+u)}{\rho+1-R_2 \cos (\theta+u)} \quad (10)$$

$$\frac{d\psi}{d\theta}=\frac{(\rho+1)[\rho+1+R_2^2-(\rho+2)R_2 \cos (\theta+u)]}{\rho[(\rho+1)^2+R_2^2-2R_2(\rho+1)\cos (\theta+u)]} \quad (11)$$

$$\frac{d^2\psi}{d\theta^2}=\frac{R_2(\rho+1)[(\rho+1)^2-R_2^2]\sin (\theta+u)}{[(\rho+1)^2+R_2^2-2R_2(\rho+1)\cos (\theta+u)]^2} \quad (12)$$

To obtain the relative angular velocity for the slide mode, out of phase, external planetary system, equations (4) and (11) are substituted into equation (1) which results in the following expression:

$$V=\frac{d\phi}{d\psi}=\frac{\dfrac{\rho+1+R_1^2-(\rho+2)R_1 \cos \theta}{(\rho+1)^2+R_1^2-2R_1(\rho+1)\cos \theta}}{\dfrac{\rho+1+R_2^2-(\rho+2)R_2 \cos (\theta+u)}{(\rho+1)^2+R_2^2-2R_2(\rho+1)\cos (\theta+u)}} \quad (13)$$

It should be noted that when $R_2 = 0$, equation (13) becomes identical with equation (9a) which is as expected since $u$ has no real meaning when $R_2 = 0$.

To obtain the value for the relative angular acceleration for this out-of-phase condition, equations (4), (5), (11), and (12) may be substituted into equation (2) or (2a), but the resultant algebraic expression becomes so cumbersome that it is more convenient to accomplish the specific calculations by evaluating each derivative independently and then substituting their values into equation (2) or (2a) to obtain the relative angular acceleration. This technique is also more desirable because it is ordinarily desired to evaluate the $\theta$ derivatives independently in any case.

Curves representing the relationship expressed by equation (13) for the relative angular velocity for a slide mode, out of phase, external gear system are shown in FIG. 21. This set of curves is also presented by way of example and illustration and is for the specific conditions where $R_1 = 1$, $R_2 = 0.5$, and $\rho = 4$. Individual curves are plotted for phase angle values of $u = 0°$, $30°$, $60°$, $90°$, $120°$, $150°$, and $180°$. It will be noted that the curve for $u = 0°$ is the same as the curve in FIG. 20 where $R_2 = 0.50$; and it will be further noted that the curve for $u = 180°$ has the same geometric effect as negative values of $R_2$ at 0 phase angle.

The introduction of a phase angle produces a non-symmetry in the relative angular velocity curves (except for $u = 0°$ or $u = 180°$) which is clearly evident in FIG. 21. This same general behavior or change in characteristics is evident for other parameter combinations. It is also obvious that the general effect of the parameter u is more pronounced for larger values of $R_2$ and is less pronounced for smaller values of $R_2$ until, when $R_2 = 0$, u has no effect whatsoever.

These typical representative curves for the slide mode external planetary system are intended to illustrate the extremely wide kinematic relationships which can be generated between the input and the output through a knowledgeable and judicious choice of the various parameters.

For both mechanical and kinematic reasons, applications arise in which it becomes desirable to utilize an internal rather than an external planetary system. The same analysis will now be made for a system in which the planetary gears operate with an internal stationary gear.

Referring to FIG. 17, which is a kinematic line drawing for a slide mode (straight radial slot) internal gear system; only the output system is shown, i.e., the output angle $\phi$ is related to the planetary angle $\theta$.

It can be seen that after the planetary gear has been rotated by the input through an angle $\theta$, from an initial starting position in which the radius $R_1$ was colinear with the line connecting the center of the planetary gear to the center of the stationary gear, the following angular displacement relationship exists:

$$\phi = \frac{\theta}{\rho} - \text{arc tan} \frac{R_1 \sin \theta}{\rho - 1 + R_1 \cos \theta} \quad (14)$$

By differentiating this expression with respect to $\theta$, the following expression is obtained:

$$\frac{d\phi}{d\theta} = \frac{(\rho-1)[\rho-1-R_1^2-(\rho-2)R_1 \cos \theta]}{\rho[(\rho-1)^2+R_1^2+2R_1(\rho-1) \cos \theta]} \quad (15)$$

By differentiating again with respect to $\theta$, the following expression is obtained:

$$\frac{d^2\phi}{d\theta^2} = \frac{R_1(\rho-1)[(\rho-1)^2-R_1^2] \sin \theta}{[(\rho-1)^2+R_1^2+2R_1(\rho-1) \cos \theta]^2} \quad (16)$$

These three equations (14), (15), and (16) have to do with the relationships of the output angle $\phi$ and the planetary gear angle $\theta$. To obtain the input-output relationship, the input system is now examined.

Referring to FIG. 18, which is a kinematic line drawing for a slide mode internal gear system, showing the the input system which relates the input angle $\psi$ to the planetary gear angle $\theta$. It will be noted that this is identical with FIG. 17 except for the terminology of the parameters. It can be seen that after the planetary gear has been rotated through an angle $\theta$ from an initial starting position in which the radius $R_2$ was colinear with the line connecting the center of the planetary gear with the center of the internal gear, and if $\theta_i = 0$ ($u = 0$), the following angular displacement relationship exists:

$$\psi = \frac{\theta}{\rho} - \text{arc tan} \frac{R_2 \sin \theta}{\rho - 1 + R_2 \cos \theta} \quad (17)$$

By differentiating this expression with respect to $\theta$, the following expression is obtained:

$$\frac{d\psi}{d\theta} = \frac{(\rho-1)[\rho-1-R_2^2-(\rho-2)R_2 \cos \theta]}{\rho[(\rho-1)^2+R_2^2+2R_2(\rho-1) \cos \theta]} \quad (18)$$

By differentiating again with respect to $\theta$, the following expression is obtained:

$$\frac{d^2\psi}{d\theta^2} = \frac{R_2(\rho-1)[(\rho-1)^2-R_2^2] \sin \theta}{[(\rho-1)^2+R_2^2+2R_2(\rho-1) \cos \theta]^2} \quad (19)$$

These three equations, (17), (18), and (19) have to do with the relationships of the input angle $\psi$ and the planetary gear angle $\theta$. In the case where the planetary radii $R_1$ and $R_2$ are colinear and therefore the measure of $\theta$ is the same for both the input and output conditions, the relative angular velocity is obtained by substituting equations (15) and (18) into equation (1), which after simplification results in the following expression:

$$V = \frac{d\phi}{d\psi} = \frac{\dfrac{\rho-1-R_1^2-(\rho-2)R_1 \cos \theta}{(\rho-1)^2+R_1^2+2R_1(\rho-1) \cos \theta}}{\dfrac{\rho-1-R_2^2-(\rho-2)R_2 \cos \theta}{(\rho-1)^2+R_2^2+2R_2(\rho-1) \cos \theta}} \quad (20)$$

To obtain the expression for the relative angular acceleration, equations (15), (16), (18), and (19) may be substituted into equation (2) or (2a), but as in prior situations, it is more convenient to perform this operation in the implicit form.

Again as in the previous analyses, $\theta$ is used as a calculating parameter as a mathematical convenience in establishing the desired relationships between the input displacement and the output displacement, relative angular velocity and relative angular acceleration.

In the special but important case where $R_2 = 0$, i.e., the eccentricity of the input eccentrics is 0, and the input eccentrics are concentric with the axes of the planetary gears, the input spider and the planetary carrier move in unison. In such cases, the input spider and the input eccentrics may be physically deleted and the planetary carrier driven directly, i.e., the planetary carrier becomes the input means. When $R_2 = 0$, equation (20) simplifies to the following:

$$V = \frac{d\phi}{d\psi} = (\rho-1) \frac{\rho-1-R_1^2-(\rho-2)R_1 \cos \theta}{(\rho-1)^2+R_1^2+2R_1(\rho-1) \cos \theta} \quad (20a)$$

The relative angular velocity curves resulting from this equation (20a) for $R_1 = 1$ and for various values of $\rho$ are shown in FIG. 22. It will be remembered that this is for the condition where the output spider has straight radial slots and that the planetary gears operate internally inside a stationary internal gear, i.e., slide mode internal planetaries. It will be noted that the relative angular velocity characteristics of the system are dependent on $\rho$, and while the curves start and end at 0 and reach the axis with zero slope at each end of a symmetrical cycle, their behavior is interestingly different for different values of $\rho$. At $\rho = 2$, the equation is equal to 0 for all points except where $\theta = 180°$, at which point it is indeterminate, and this curve is not shown. For $\rho = 3$, the relative angular velocity increases slowly at the beginning of the stroke, then climbs rapidly to reach a relatively sharp peak at mid-stroke with a maximum value of 4; practically, this means that the maximum angular velocity of the output at the center or midpoint of the cycle is four times the input angular velocity. At larger values of $\rho$ the relative angular velocity increases more rapidly at the start of the cycle, and the maximum relative angular velocity reached at mid-cycle becomes smaller, and the peak more rounded, until, as $\rho$ approaches infinity, the maximum relative angular velocity at mid-cycle approaches 2.

It is very interesting to note that this behavior with an internal planetary system, insofar as the effect of $\rho$ is concerned, is exactly the opposite as that noted with the external planetary system as is evident by comparing FIG. 22 with FIG. 19. In each instance, however, the curves approach the same limiting curve as the value of $\rho$ is increased.

The relative angular velocity curves resulting from the more general equation (20), wherein $R_2 \neq 0$ are shown in FIG. 23. It will again be understood that these curves are shown by way of illustration to indicate the effect of the parameter $R_2$ for a representative fixed condition for the other parameters, in which $\rho = 4$ and $R_1 = 1$, as was the case for the external gear condition shown in FIG. 20. Referring to FIG. 23, it will be noted that the curve for $R_2 = 0$ is identical with the curve in FIG. 22 in which $\rho = 4$.

It will further be noted that for all values of $R_2$, the curves are symmetrical about the midpoint of the cycle, and that all curves still reach the axis with zero slope at the ends of the cycle. As $R_2$ is made more positive, the relative angular velocity rises more rapidly from the ends of the cycle, and becomes "flatter" during the center of the cycle, and reaches a lower peak value at mid-cycle. Conversely, if $R_2$ is made increasingly negative, the opposite behavior of the relative angular velocity curves is noted; i.e., the relative angular velocity increases more slowly from the ends of the cycle, but reaches a higher mid-cycle value, with a shorter duration of such higher value.

Therefore, while still maintaining symmetrical conditions about the midpoint of the cycle, a very high degree of versatility and control can be obtained by judicious and knowledgeable choice of the $R_2$ parameter.

These effects, while shown only for the single condition where $\rho = 4$, and $R_1 = 1$ apply also for other values of $\rho$, although it will be understood that the "base" curve, where $R_2 = 0$, is different for each different value of $\rho$.

It will also be noted that the effect of the $R_2$ parameter on the relative angular velocity curves is the same for the internal planetary configuration as it was shown to be for the external planetary configuration; while the effect of $\rho$ is in the opposite direction for the internal planetary configuration as compared to the external planetary configuration.

The foregoing represents the characteristics of a slide mode, in phase, internal planetary system. To obtain the characteristics of a slide mode, out of phase, internal planetary system, the same techniques utilized in the external planetary system for out-of-phase analysis are employed.

Referring again to FIG. 18 and the equations derived therefrom, i.e., equations (17), (18), and (19), it can be seen that if $\theta_i$ in FIG. 18 is displaced from the $\theta$ shown in FIG. 17, such that:

$$\theta_i = \theta + u$$

where $u$ is a constant angle defined as a phase angle between the radius $R_1$ and the radius $R_2$ such that it is positive if $R_2$ leads $R_1$ in the direction of planetary gear rotation; then the relationships existing between $\psi$ and $\theta$ by successive differentiation become:

$$\psi = C + \frac{\theta + u}{\rho} - \arctan \frac{R_2 \sin(\theta + u)}{\rho - 1 + R_2 \cos(\theta + u)} \quad (21)$$

$$\frac{d\psi}{d\theta} = \frac{(\rho-1)[\rho - 1 - R_2^2 - R_2(\rho-2)\cos(\theta+u)]}{\rho[(\rho-1)^2 + R_2^2 + 2R_2(\rho-1)\cos(\theta+u)]} \quad (22)$$

$$\frac{d^2\psi}{d\theta^2} = \frac{R_2(\rho-1)[(\rho-1)^2 - R_2^2]\sin(\theta+u)}{[(\rho-1)^2 + R_2^2 + 2R_2(\rho-1)\cos(\theta+u)]^2} \quad (23)$$

To obtain the relative angular velocity for the slide mode, out of phase, internal planetary system, equations (15) and (22) are substituted into equation (1) which results in the following expression:

$$V = \frac{d\phi}{d\psi} = \frac{\dfrac{\rho - 1 - R_1^2 - R_1(\rho-2)\cos\theta}{(\rho-1)^2 + R_1^2 + 2R_1(\rho-1)\cos\theta}}{\dfrac{\rho - 1 - R_2^2 - R_2(\rho-2)\cos(\theta+u)}{(\rho-1)^2 + R_2^2 + 2R_2(\rho-1)\cos(\theta+u)}} \quad (24)$$

It should be noted that when $R_2 = 0$, equation (24) becomes identical with equation (20a) which is as expected since $u$ has no real meaning when $R_2 = 0$.

To obtain the expression for the relative angular acceleration, equations (15), (16), (22) and (23) may be substituted into equation (2) or (2a), but as in prior situations, it is more convenient to perform this operation in the implicit form.

Curves representing the relationship expressed by equation (24) for the relative angular velocity for a slide mode, out of phase, internal gear system are shown in FIG. 24. This set of curves is again presented by way of example and illustration and is for the specific conditions where $R_1 = 1$, $R_2 = 0.5$, and $\rho = 4$. Individual curves are plotted for phase angle values of $u = 0°, 30°, 60°, 90°, 120°, 150°$ and $180°$. It will be noted that the curve for $u = 0°$ is the same as the curve in FIG. 23 where $R_2 = 0.50$; and it will be further noted that the curve for $u = 180°$ is identical with the curve in FIG. 23 where $R_2 = -0.50$. Here again, it will be seen that a phase angle of $180°$ has the same geometric effect as negative values of $R_2$ at 0 phase angle.

The introduction of a phase angle produces a non-symmetry in the relative angular velocity curves (except for $u = 0°$ or $u = 180°$) which is clearly evident in FIG. 24. This same general behavior or effect on characteristics is evident for other parameter combinations. Furthermore, it will be noted that the effect of the parameter $u$ is comparable in both the external and internal planetary configurations. The effect appears more pronounced in the internal planetary configuration because of the already large difference in the base curve wherein $u = 0$. It is also obvious that the general effect of the parameter $u$ is more pronounced for larger values of $R_2$ and is less pronounced for smaller values of $R_2$ until, when $R_2 = 0$, $u$ has no effect whatsoever.

These typical representative curves for the slide mode internal planetary system are intended to illustrate the extremely wide kinematic relationships which can be generated between the input and the output through a knowledgeable and judicious choice of the various parameters. This is in addition to those which can be generated with the external planetary system.

All the foregoing kinematic analyses of the output characteristics were made on the assumption that the input angular velocity was a constant. If the input velocity is not a constant, the output characteristics may be calculated according to these transfer functions:

$V_o = V V_i$
$A_o = V_i^2 A + V A_i$ where $A$ = Relative angular acceleration = $d^2\phi/d\psi^2$
$V$ = Relative angular velocity = $d\phi/d\psi$
$A_i$ = Angular acceleration of the input member
$V_i$ = Angular velocity of the input member
$A_o$ = Angular acceleration of the output member
$V_o$ = Angular velocity of the output member The foregoing represent the kinematic development of the slide mode system, for both internal and external planetary gears, and for the special but important condition where the slots in both the input spider and output spider are straight and radial with respect to the axis of rotation of the spiders. Even with such a highly restricted system, it can be seen that a very high degree of kinematic flexibility can be achieved through a knowledgeable choice of parameters.

A still greater range of kinematic output characteristics may be achieved by making the straight slots in the input spider or output spider or both non-radial with respect to the axis of rotation of the respective spiders. It can be seen that when the output spider slots are straight but non-radial, the radial component of the output eccentric movement creates a non-linear component of angular movement of the output spider. Similarly, it can be seen that when the input spider slots are straight but non-radial, the radial component of the input spider movement creates a non-linear component of angular movement of the planetary carrier assembly. These effects may again be knowledgeably employed to modify the output characteristics over a greater range than is possible with the straight radial slots.

An even greater range of kinematic output flexibility may be achieved by employing slots in the input and output spider which are not straight, but are configured to meet a specific output requirement over some fractional range of each output cycle. This flexiblity is as great as can be attained with any cam system, and is in many ways superior to a cam system, because the tailored curvature of the slot becomes, in effect, a vernier on the kinematic relationship desired rather than the sole means of determining the entire kinematic characteristics of the system. Stated another way, the general input-output relationship desired may be closely approximated by one of the many characteristic sets available using the straight slot curves. Then, using the parameters which generate this approximate relationship, the slot configuration may be slightly tailored to generate the precise relationship desired.

Slots having a uniform curvature are the kinematic equivalent of a link mode system which is separately described below.

The link mode systems are kinematically similar to the slide mode systems. They are mechanically somewhat more simple since they eliminate the sliding connection between the planetary gear eccentrics and their associated spiders. On the other hand, they are kinematically more complex because of the change in projected lengths of the connecting links during the rotation of the planetary gears. This in effect adds a predominant second harmonic and lesser higher harmonics whose amplitude and phase may be controlled by judicious choice of link lengths and spider arc lengths.

If the pivot point between a connecting link and its mating spider arm is on a line which is perpendicular to the line connecting the center of the stationary gear to the center of the associated planetary gear, at the center of the associated planetary gear, when the planetary gear is in its previously defined starting position, the characteristics of the system are basically similar to that of a straight radial slot system. Under these conditions, as the length of the connecting link is made longer, the similarity becomes closer. It can be seen that the link is the kinematic equivalent of a curved slot whose radius of curvature is constant and equal to the equivalent link length. Under the conditions described above, the straight radial slot is a chord of the equivalent uniformly curved slot and as the radius of the equivalent curved slot becomes larger, the curved slot more nearly approaches its chord.

When the pivot point between the link and its mating spider is not on the line defined above, the characteristics of the system most nearly approach a straight slot system in which the slot is inclined at an angle such that a perpendicular thereto at the center of the planetary gear contains the pivot point between the connecting link and its mating spider, again with the planetary gear positioned such that the associated eccentric is at one end or the other of the equivalent straight slot. Once again, the greater the link length, the greater the equivalence to an inclined straight slot.

The above analysis, while lengthy, is relatively brief in view of the many meaningful and useful parameters which are possible and a fully detailed analysis would literally require much more space. As in the specific design of other less flexible kinematic systems, a knowledgeable understanding of the parameter interrelationships, and employing the principles of superposition, permits a person skilled and experienced in these interrelationships to construct a grouping of parameters to achieve the desired output characteristics.

It will be further understood that the input and output systems need not operate in the same mode and that completely different parameters may be used in each.

It will also be noted that this system can operate at very high speeds because of the absence of any interchanges.

Mechanically, no component moves into or out of contact with any other, i.e., all pivots, slides, gear meshes, etc. remain in contact or in mesh as the case may be. Mathematically, as long as the denominators of the defining equations of motion are not permitted to reach zero (which is not a difficult constraint to meet), all these functions are continuous and have continuous functions as derivatives. Even the relative angular acceleration, when differentiated again to yield the third derivative of motion, often times referred to as "jerk," has a derivative which is mathematically continuous, and, therefore, there are no discontinuities in the slope of the acceleration curve, let alone discontinuities in the curve itself. Mechanisms exhibiting these types of kinematic characteristics operate more "smoothly" and hence are inherently capable of reaching higher speeds than mechanisms which have discontinuities in their equations of motion.

I claim:

1. A multiple step rotary indexing system having highly flexible kinematic characteristics from input to output comprising:
   a. a first support member,
   b. an input member rotatably mounted in said support member,
   c. an output member rotatably mounted in said support member and on the same axis as said input member, and
   d. an intermediate means connecting said input member to said output member comprising:
      1. a stationary circular reaction member on the same axis as said input member and said output member,
      2. a planetary carrier frame rotatably mounted in said support member,
      3. one or more planetary members mounted in said planetary carrier frame positioned to roll without slipping on said circular reaction member in a planetary configuration,
      4. an input shaft extending from each said planetary members, the axis of each said shaft being parallel to, but displaced from, the axis of each said planetary member,
      5. means connecting said input member to each said input shaft,
      6. an output shaft extending from each said planetary member, the axis of each said output shaft being parallel to the axis of each said planetary member, and
      7. means connecting said output member to said output shaft.

2. A multiple step rotary indexing system as defined in claim 1 in which said circular reaction member is an external gear having teeth to engage matching teeth on said planetary members.

3. A multiple step rotary indexing system as defined in claim 1 in which said circular reaction member is an internal gear having teeth to engage matching teeth on said planetary members.

4. A multiple step rotary indexing system as defined in claim 1 in which the means connecting said input member to each said input shaft comprises a plurality of slide blocks slidably movable in said input member in a predetermined guided path generally radial in direction from said input axis, and a rotary connection between said respective slide blocks and said respective input shafts.

5. A multiple step rotary indexing system as defined in claim 1 in which the means connecting said output member to each said output shaft comprises a plurality of slide blocks slidably movable in said output member in a predetermined guided path generally radial in direction from said output axis, and a rotary connection between said respective slide blocks and said respective output shafts.

6. A multiple step rotary indexing system as defined in claim 1 in which the means connecting said input member to each said input shaft comprises a plurality of motion transmitting links pivotally connected at spaced points respectively to said input member and to said input shafts of said planetary members.

7. A multiple step rotary indexing system as defined in claim 1 in which the means connecting said output member to each said output shaft comprises a plurality of motion transmitting links pivotally connected at spaced points respectively to said output member and to said output shafts of said planetary members.

8. A multiple step rotary indexing system having highly flexible kinematic characteristics from input to output comprising:
   a. a support member,
   b. an input member and an output member rotatably supported in axially spaced relation on said support member,
   c. means to drive said input member in rotation, and
   d. motion transmitting means supported on said support means between said input and said output members comprising:
      1. a plurality of planetary gear members disposed around the axis of said input means, each rotatable on an axis spaced a predetermined distance from the axis of said input means,
      2. input drive means connecting said input member and one side of said planetary gear member on axes of rotation spaced from the axis of rotation of the gear members,
      3. output drive means connecting said input members and the other side of said planetary gear members on axes of rotation spaced from the axis of rotation of the gear members, and
      4. a means on said support member serving as a reaction gear track for engagement with external teeth of said planetary gear members to transmit input motion to said output member.

9. A multiple step rotary indexing system as defined in claim 8 in which said input and said output members are each provided with slide tracks extending generally radially thereof, and said input and output drive means include slide blocks movable in said slots and rotatably associated with said planetary gear members.

10. A multiple step rotary indexing system as defined in claim 8 in which said input drive means includes a plurality of drive links between said input member and said planetary gear members movable in a plane transverse of the axis of said input member each pivoted respectively at spaced points to said input member and to a planetary gear member.

11. A multiple step rotary indexing system as defined in claim 8 in which said output drive means includes a plurality of drive links between said output member and said planetary gear members movable in a plane transverse of the axis of said output member, each pivoted respectively at spaced points to said input member and to a planetary gear member.

* * * * *